US010480232B2

(12) United States Patent
Ishikawa

(10) Patent No.: US 10,480,232 B2
(45) Date of Patent: Nov. 19, 2019

(54) SLIDING DOOR STRUCTURE

(71) Applicant: TOYOTA JIDOSHA KABUSHIKI KAISHA, Toyota-shi, Aichi-ken (JP)

(72) Inventor: Hironari Ishikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 15/689,233

(22) Filed: Aug. 29, 2017

(65) Prior Publication Data

US 2018/0119469 A1    May 3, 2018

(30) Foreign Application Priority Data

Oct. 28, 2016  (JP) ................................ 2016-212060

(51) Int. Cl.
*E05D 15/10* (2006.01)
*B60J 5/04* (2006.01)
*B60J 5/06* (2006.01)

(52) U.S. Cl.
CPC ............ *E05D 15/101* (2013.01); *B60J 5/047* (2013.01); *B60J 5/06* (2013.01); *E05D 2015/1026* (2013.01); *E05Y 2900/531* (2013.01)

(58) Field of Classification Search
CPC .............. E05D 15/101; E05D 15/1047; E05D 15/1081
See application file for complete search history.

(56) References Cited

U.S. PATENT DOCUMENTS 3,051,999 A * 9/1962 Schimek .................... B60J 5/06
  16/370
3,935,674 A * 2/1976 Williams ............. E05D 15/1081
  49/212
3,994,094 A * 11/1976 Marzocco ............ B61D 19/005
  49/212

(Continued)

FOREIGN PATENT DOCUMENTS

DE        10200882 A1    7/2003
DE   102006054829 A1    5/2007

(Continued)

OTHER PUBLICATIONS

Mar. 22, 2018 Search Report issued in European Patent Application No. 17197590.7.

*Primary Examiner* — Catherine A Kelly
(74) *Attorney, Agent, or Firm* — Oliff PLC

(57) ABSTRACT

A sliding door structure includes a door body, a vehicle body rail, a vehicle body rail support member, a door rail, and a door rail support member. The vehicle body rail support member includes a vehicle body-side end portion coupled to the vehicle body rail and capable of moving along the vehicle body rail, and a door-side end portion coupled to the door body. The vehicle body rail support member is capable of rotating about the vehicle body-side end portion, and of rotating about the door-side end portion. The door rail support member is configured to include a door-side end portion coupled to the door rail and capable of moving along the door rail, and a vehicle body-side end portion coupled to the vehicle body. The door rail support member is capable of rotating about the door-side end portion, and of rotating about the vehicle body-side end portion.

8 Claims, 16 Drawing Sheets

(56) References Cited

U.S. PATENT DOCUMENTS

| | | | | |
|---|---|---|---|---|
| 4,268,996 | A * | 5/1981 | Allen | B60J 5/06 49/212 |
| 4,551,945 | A * | 11/1985 | von Resch | E05D 15/1013 49/130 |
| 5,896,704 | A * | 4/1999 | Neag | E05D 15/1081 296/155 |
| 5,921,613 | A * | 7/1999 | Breunig | B60J 5/06 296/146.12 |
| 6,183,039 | B1 * | 2/2001 | Kohut | E05D 15/1081 296/146.12 |
| 6,926,342 | B2 * | 8/2005 | Pommeret | E05D 15/1081 296/146.12 |
| 7,611,190 | B1 | 11/2009 | Elliott et al. | |
| 7,658,438 | B1 * | 2/2010 | Elliott | E05D 15/1081 296/155 |
| 7,887,118 | B2 * | 2/2011 | Elliott | B60J 5/06 296/146.12 |
| 7,896,425 | B2 * | 3/2011 | Elliott | E05D 15/0608 16/359 |
| 8,234,816 | B2 * | 8/2012 | Heuel | E05D 3/127 49/211 |
| 8,684,445 | B2 * | 4/2014 | Ellinghaus | E05D 15/101 296/146.12 |
| 9,440,519 | B2 * | 9/2016 | Choi | E06B 3/50 |
| 9,475,368 | B2 * | 10/2016 | Choi | B60J 5/0479 |
| 2010/0095595 | A1 * | 4/2010 | Hanaki | E05D 15/101 49/359 |
| 2015/0183304 | A1 | 7/2015 | Choi | |
| 2018/0126829 | A1 * | 5/2018 | Ishikawa | B60J 5/0468 |

FOREIGN PATENT DOCUMENTS

| | | | | |
|---|---|---|---|---|
| DE | 102008008129 | A1 | 8/2009 | |
| EP | 1255014 | A1 | 11/2002 | |
| EP | 1788177 | A1 * | 5/2007 | B60J 5/06 |
| FR | 2881459 | A1 * | 8/2006 | E05D 15/101 |
| GB | 738 486 | A | 10/1955 | |
| JP | S63-222922 | A | 9/1988 | |
| JP | 2001-317269 | A | 11/2001 | |
| JP | 2004-175199 | A | 6/2004 | |
| JP | 2007-177587 | A | 7/2007 | |
| JP | 2007-217998 | A | 8/2007 | |
| JP | 2008-024268 | A | 2/2008 | |
| WO | 02/42589 | A1 | 5/2002 | |

* cited by examiner

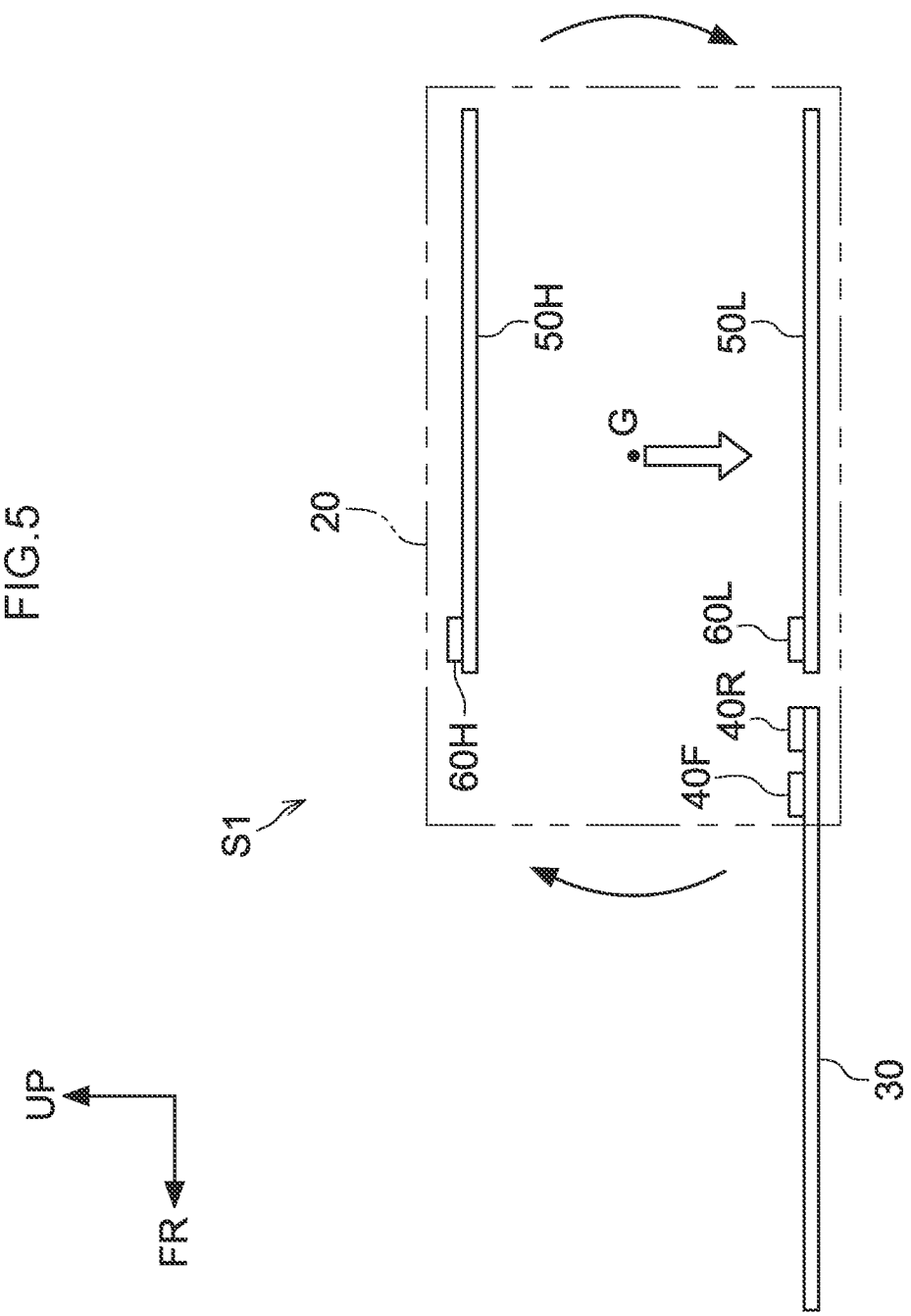

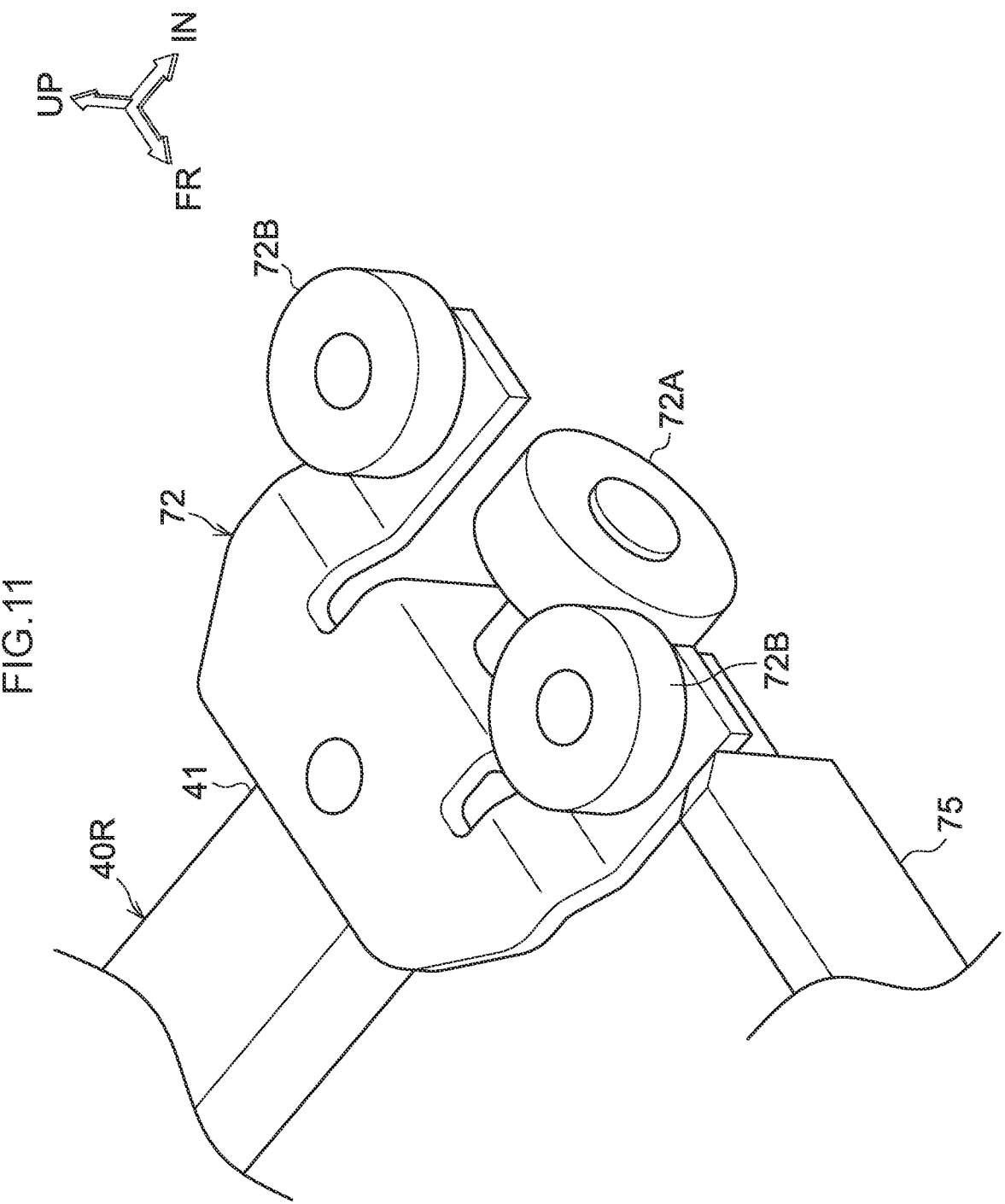

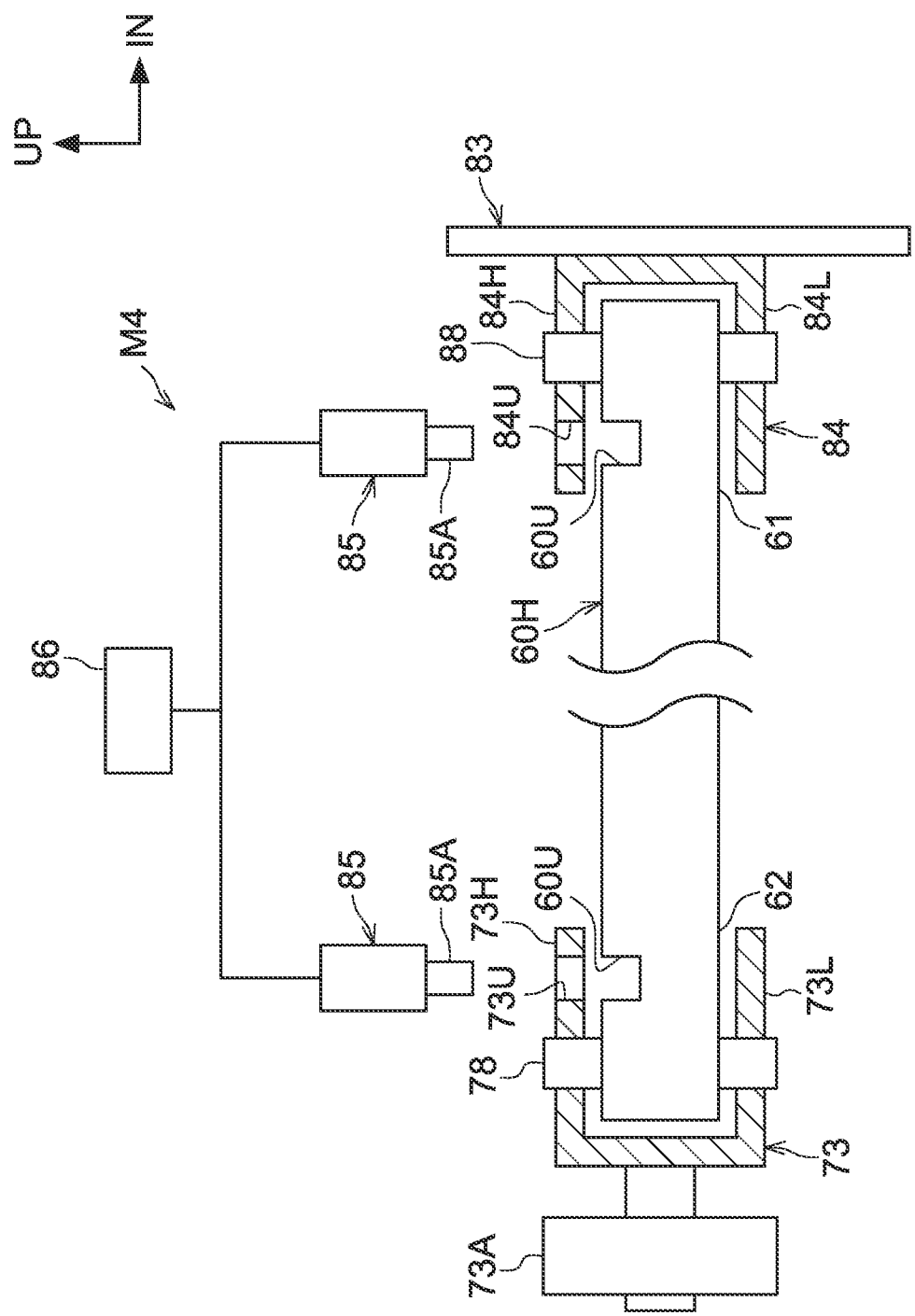

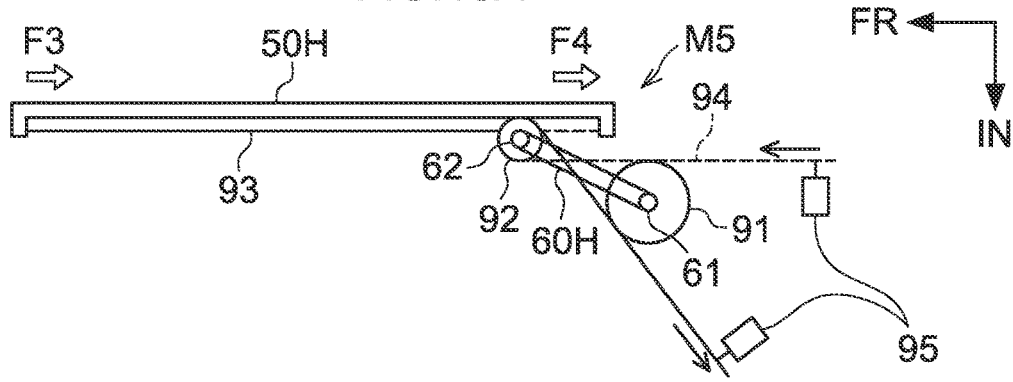
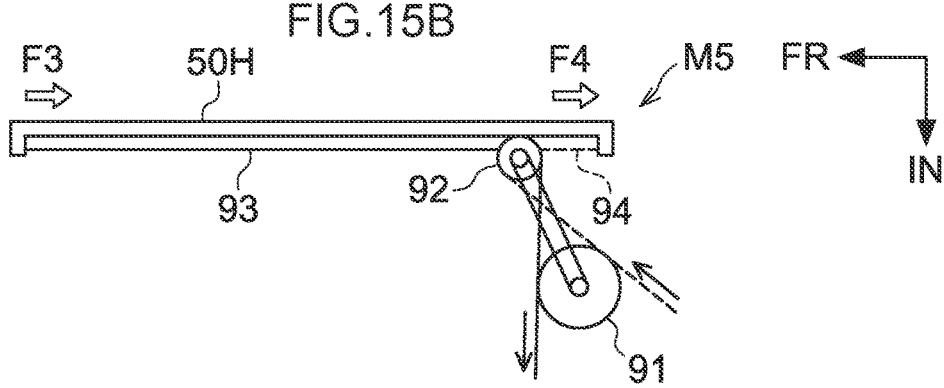
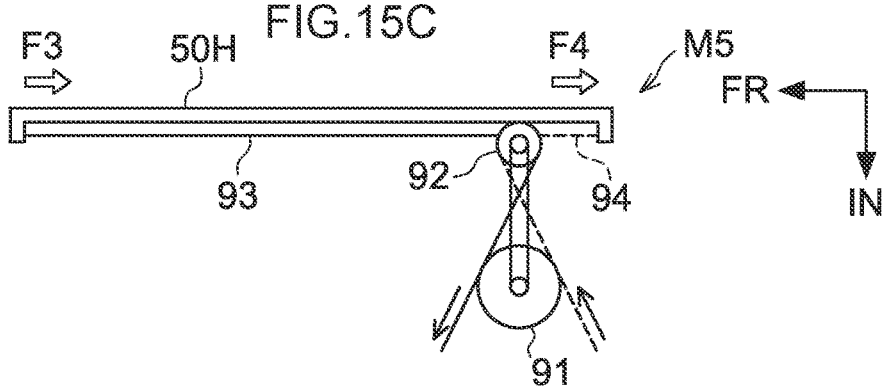
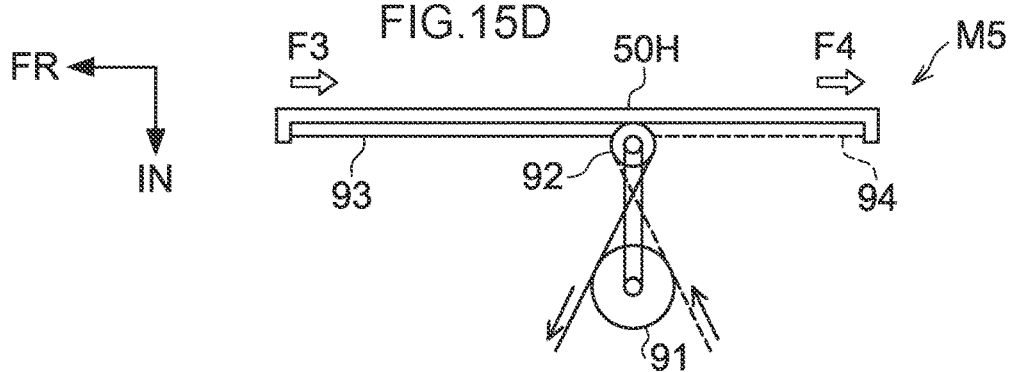

SLIDING DOOR STRUCTURE

CROSS-REFERENCE TO RELATED APPLICATION

This application claims priority under 35 USC 119 from Japanese Patent Application No. 2016-212060 filed on Oct. 28, 2016, the disclosure of which is incorporated by reference herein.

BACKGROUND

Technical Field

The present invention relates to a sliding door structure.

Related Art

Japanese Patent Application Laid-Open (JP-A) No. 2004-175199 describes a sliding door structure. In this sliding door structure, a slide rail is provided extending along a vehicle front-rear direction at a lower portion of a door opening in a vehicle body. A slide member is provided so as to slide along the slide rail. Moreover, a coupling link is rotatably attached to the slide member, and out of a pair of extension portions configuring the coupling link, a first extension portion is coupled to the sliding door.

Moreover, out of the pair of extension portions configuring the coupling link, a second extension portion is provided so as to slide along a guide rail provided to the vehicle body. A vehicle front end portion of the guide rail is curved toward a vehicle width direction inner side. Accordingly, the coupling link rotates when the sliding door is slid toward the vehicle front, such that the sliding door moves in a direction approaching the vehicle body.

Moreover, a guide rail extending from a rear portion of the door opening in the vehicle body toward the vehicle rear is provided separately. The sliding door is supported on the vehicle body by a rear sliding support section that is configured including this guide rail. A vehicle front end portion of this guide rail is curved toward the vehicle width direction inner side.

In order to support the sliding door so as to be capable of sliding, the technology described above is provided with not only the slide rail provided at the lower portion of the opening in the vehicle body, but also with the guide rail extending toward the vehicle rear from the rear portion of the door opening in the vehicle body. This places constraints on the degree of styling freedom for the vehicle body at the rear of the door opening.

Moreover, the vehicle front end portion of the guide rails are curved toward the vehicle width direction inner side in order to cause the sliding door to move in a direction approaching the vehicle body and in a direction away from the vehicle body. It is thus necessary to design the vehicle body to accommodate the curved shapes of the guide rails, and this point also places constraints on the degree of styling freedom for the vehicle body.

SUMMARY

The present invention provides a sliding door structure capable of improving the degree of styling freedom for a vehicle body while maintaining stable support of a door body.

A sliding door structure of a first aspect of the present invention includes a door body, a vehicle body rail, a vehicle body rail support member, a door rail, and a door rail support member. The vehicle body rail is provided to a vehicle body so as to extend along a door opening-and-closing direction in a straight line shape. The vehicle body rail support member is configured to include a vehicle body-side end portion coupled to the vehicle body rail and capable of moving along the vehicle body rail, and a door-side end portion coupled to the door body. The vehicle body rail support member is also capable of rotating with respect to the vehicle body about the vehicle body-side end portion, and is capable of rotating with respect to the door body about the door-side end portion. The door rail is provided to the door body so as to extend along the door opening-and-closing direction in a straight line shape. The door rail support member is configured to include a door-side end portion coupled to the door rail and capable of moving along the door rail, and a vehicle body-side end portion coupled to the vehicle body. The door rail support member is also capable of rotating with respect to the door body about the door-side end portion, and is capable of rotating with respect to the vehicle body about the vehicle body-side end portion.

In the first aspect, the vehicle body rail is provided to the vehicle body, and the vehicle body-side end portion of the vehicle body rail support member is coupled to the vehicle body rail. The door-side end portion of the vehicle body rail support member is coupled to the door body. The door rail is provided to the door body, and the door-side end portion of the door rail support member is coupled to the door rail. The vehicle body-side end portion of the door rail support member is coupled to the vehicle body. The door body is thereby supported by the vehicle body.

Moreover, the vehicle body-side end portion of the vehicle body rail support member is capable of moving along the vehicle body rail, and the door-side end portion of the door rail support member is capable of moving along the door rail. The vehicle body rail and the door rail both extend in straight line shapes along the door opening-and-closing direction. Accordingly, the door body is capable of sliding in the door opening-and-closing direction with respect to the vehicle body.

Moreover, the vehicle body rail support member is capable of rotating with respect to the vehicle body about the vehicle body-side end portion, and is also capable of rotating with respect to the door body about the door-side end portion. The door rail support member is capable of rotating with respect to the door body about the door-side end portion, and is also capable of rotating with respect to the vehicle body about the vehicle body-side end portion. Accordingly, the door body is capable of swinging so as to move away from the vehicle body, and the door body is also capable of swinging so as to approach the vehicle body.

In the first aspect, adopting the configuration described above enables an improvement in the degree of styling freedom of the vehicle body while maintaining support stability of the door body.

Namely, in the first aspect, the door body is supported through the door rail provided to the door body. Accordingly, the number of rails provided to the vehicle body can be reduced in comparison to a sliding door structure that does not include a door rail, while still maintaining the support stability of the door body. Reducing the number of rails provided to the vehicle body improves the degree of styling freedom of the vehicle body.

Moreover, due to adopting the above configuration there is no need to provide the door rail and the vehicle body rail with curved sections in order to move the door body away from the vehicle body and toward the vehicle body. This thereby enables an increase in the thickness of the door body to be suppressed, and improves the degree of styling freedom of the portion of the vehicle body provided with the vehicle body rail.

A sliding door structure of a second aspect of the present invention is the first aspect wherein, when a sliding door including the door body opens from a fully closed state the door body swings so as to move away from the vehicle body by the vehicle body rail support member rotating with respect to the vehicle body about the vehicle body-side end portion of the vehicle body rail support member and the door rail support member rotating with respect to the vehicle body about the vehicle body-side end portion of the door rail support member while a position of the vehicle body-side end portion of the vehicle body rail support member with respect to the vehicle body rail and a position of the door-side end portion of the door rail support member with respect to the door rail remain fixed. After the door body has swung and the door body has moved away from the vehicle body by a predetermined separation, the door body slides in the door-opening direction with respect to the vehicle body by the vehicle body-side end portion of the vehicle body rail support member moving along the vehicle body rail, and the door-side end portion of the door rail support member moving along the door rail while an angle of the vehicle body rail support member with respect to the vehicle body and an angle of the door rail support member with respect to the vehicle body remain fixed.

In the second aspect, when the sliding door is opened from the fully closed state, the position of the vehicle body-side end portion of the vehicle body rail support member with respect to the vehicle body rail, and the position of the door-side end portion of the door rail support member with respect to the door rail remain fixed while the vehicle body rail support member rotates with respect to the vehicle body about the vehicle body-side end portion of the vehicle body rail support member, and the door rail support member rotates with respect to the vehicle body about the vehicle body-side end portion of the door rail support member. The door body thus swings so as to move away from the vehicle body.

Moreover, after the door body has swung and the door body has moved away from the vehicle body by the predetermined separation, the angle of the vehicle body rail support member with respect to the vehicle body and the angle of the door rail support member with respect to the vehicle body remain fixed, while the vehicle body-side end portion of the vehicle body rail support member moves along the vehicle body rail and the door-side end portion of the door rail support member moves along the door rail. The door body thus slides toward the door-opening direction with respect to the vehicle body.

Accordingly, the operation of the door body is split into a swing operation and a slide operation.

A sliding door structure of a third aspect of the present invention is the second aspect, wherein a length direction of the vehicle body rail support member and of the door rail support member runs in a direction perpendicular to the door opening-and-closing direction in a state in which the door body has moved away from the vehicle body by the predetermined separation.

In the third aspect, the length direction of the vehicle body rail support member and of the door rail support member runs in a direction perpendicular to the door opening-and-closing direction in the state in which the door body has moved away from the vehicle body by the predetermined separation. Accordingly, when the door body swings from the fully closed state so as to move away from the vehicle body, at the moment the door body reaches the predetermined separation from the vehicle body, namely the moment a switch between the swing operation and the slide operation takes place, the movement direction of the door body comes into alignment with the door-opening direction. Accordingly, the operation of the door body transitions smoothly from the swing operation to the slide operation. This thereby enables smooth door opening and closing operations.

A sliding door structure of a fourth aspect of the present invention is any one of the first aspect to the third aspect, wherein the sliding door structure further includes a column that is provided to a door-closing direction side end portion of the vehicle body rail, and an opening that is provided to the vehicle body-side end portion of the vehicle body rail support member. In a fully closed state, the column intrudes into the opening such that the column is positioned at a rotation center of the vehicle body rail support member with respect to the vehicle body, and an opening direction of the opening faces in a direction angled toward a vehicle inner side with respect to a door-closing direction. When a sliding door including the door body opens from the fully closed state, the vehicle body rail support member rotates about the column with respect to the vehicle body while the column remains in a state intruding into the opening. When the sliding door opens from the fully closed state, until the opening direction comes into alignment with the door-closing direction, movement of the vehicle body-side end portion of the vehicle body rail support member along the vehicle body rail in a door-opening direction is restricted due to receiving a reaction force toward the door-closing direction from the column intruding into the opening. When the opening direction aligns with the door-closing direction, the restriction of movement of the vehicle body-side end portion of the vehicle body rail support member along the vehicle body rail in the door-opening direction is released due to no longer receiving the reaction force toward the door-closing direction from the column intruding into the opening.

In the fourth aspect, the column is provided to the door-closing direction side end portion of the vehicle body rail, and the opening is provided to the vehicle body-side end portion of the vehicle body rail support member.

Moreover, when in the fully closed state, the column intrudes into the opening, such that the column is positioned at the rotation center of the vehicle body rail support member with respect to the vehicle body. In the fully closed state, the opening direction of the opening faces in a direction angled toward the vehicle inner side with respect to the door-closing direction.

When the sliding door opens from the fully closed state, the vehicle body rail support member rotates about the column with respect to the vehicle body with the column remaining in a state intruding into the opening. Moreover, when the sliding door opens from the fully closed state, until the opening direction comes into alignment with the door-closing direction, movement of the vehicle body-side end portion of the vehicle body rail support member along the vehicle body rail in the door-opening direction is restricted due to receiving a reaction force in the door-closing direction from the column intruding into the opening. Accordingly, when the sliding door opens from the fully closed state, the operation of the door body is limited to the swing operation only until the opening direction comes into alignment with the door-closing direction.

Then, when the vehicle body rail support member continues to rotate with respect to the vehicle body, the opening direction of the opening formed at the vehicle body-side end portion of the vehicle body rail support member comes into alignment with the door-closing direction. When the opening direction is in alignment with the door-closing direction, the vehicle body-side end portion of the vehicle body rail support member no longer receives a reaction force toward the door-closing direction from the column intruding into the opening, such that the restriction of movement of the vehicle body-side end portion of the vehicle body rail support member along the vehicle body rail in the door-opening direction is released. The slide operation of the door body thus becomes possible.

Due to the above, the swing operation state of the door body can be implemented by a simple configuration.

A sliding door structure of a fifth aspect of the present invention is any one of the first aspect to the fourth aspect, wherein the sliding door structure further includes a rotation restricting rail that is provided to the vehicle body so as to extend along the door opening-and-closing direction in a straight line shape, and a rotation restricting rail contact portion that is provided to the vehicle body-side end portion of the vehicle body rail support member. In a state close to a fully open state, the vehicle body rail support member is restricted from rotating with respect to the vehicle body by the rotation restricting rail contact portion contacting the rotation restricting rail. When closing a sliding door including the door body, the restriction of the rotation of the vehicle body rail support member with respect to the vehicle body is released by the vehicle body-side end portion of the vehicle body rail support member moving along the vehicle body rail in a door-closing direction, and the rotation restricting rail contact portion reaching a door-closing direction side end portion of the rotation restricting rail.

In the fifth aspect, the rotation restricting rail extending in a straight line shape along the door opening-and-closing direction is provided to the vehicle body, and the rotation restricting rail contact portion is provided to the vehicle body-side end portion of the vehicle body rail support member.

In a state close to the fully open state, the rotation restricting rail contact portion contacts the rotation restricting rail, thereby restricting the vehicle body rail support member from rotating with respect to the vehicle body. Moreover, when closing the sliding door, the vehicle body-side end portion of the vehicle body rail support member moves along the vehicle body rail in the door-closing direction, and the rotation restricting rail contact portion reaches the door-closing direction side end portion of the rotation restricting rail, thereby releasing the restriction of rotation of the vehicle body rail support member with respect to the vehicle body.

Due to the above, the slide operation state of the door body can be implemented by a simple configuration.

A sliding door structure of a sixth aspect of the present invention is any one of the first aspect to the fifth aspect, further including a vehicle body-side winding roller, a door-side winding roller, a first wire, a second wire, and a drive device. The vehicle body-side winding roller is attached to the vehicle body-side end portion of the door rail support member. The door-side winding roller is attached to the door-side end portion of the door rail support member. The first wire has one end fixed to a door-closing direction side end portion of the door rail, and has an intermediate portion entrained around the door-side winding roller. The second wire has one end fixed to a door-opening direction side end portion of the door rail, and has an intermediate portion entrained around the door-side winding roller. The drive device is provided to the vehicle body, is connected to another end side of the first wire and to another end side of the second wire, and generates a force to cause the door body to perform a swing operation and a force to cause the door body to perform a slide operation at the same time.

In the sixth aspect, the vehicle body-side winding roller is attached to the vehicle body-side end portion of the door rail support member, and the door-side winding roller is attached to the door-side end portion of the door rail support member. The first wire is also provided, with the one end of the first wire being fixed to the door-closing direction side end portion of the door rail. The intermediate portion of the first wire is entrained around the door-side winding roller. The second wire is also provided, with the one end of the second wire being fixed to the door-opening direction side end portion of the door rail. The intermediate portion of the second wire is entrained around the door-side winding roller. The other end side of the first wire and the other end side of the second wire are connected to the drive device provided to the vehicle body. Due to making configuration as described above, a force to make the door body perform the swing operation and a force to make the door body perform the slide operation can be generated at the same time by the drive device. This thereby enables a simple drive mechanism for the door body to be achieved. Moreover, an increase in the weight of the sliding door can be suppressed by providing the drive device to the vehicle body.

A sliding door structure of a seventh aspect of the present invention is any one of the first aspect to the sixth aspect, further including a second door rail, a second door rail support member, and a vertical coupling member. The second door rail is provided to the door body at a different vertical direction position to the door rail, and extends along the door opening-and-closing direction in a straight line shape. The second door rail support member is configured to include a door-side end portion coupled to the second door rail and capable of moving along the second door rail, and a vehicle body-side end portion coupled to the vehicle body. The second door rail support member is capable of rotating with respect to the door body about the door-side end portion of the second door rail support member, and is capable of rotating with respect to the vehicle body about the vehicle body-side end portion of the second door rail support member. The vertical coupling member couples the door-side end portion of the door rail support member and the door-side end portion of the second door rail support member together in a vertical direction.

In the seventh aspect, the second door rail that extends in a straight line shape along the door opening-and-closing direction is provided to the door body at a different position to the door rail in the vertical direction. The door-side end portion of the second door rail support member is coupled to the second door rail so as to be capable of moving along the second door rail. Moreover, the vehicle body-side end portion of the second door rail support member is coupled to the vehicle body. The second door rail support member is capable of rotating with respect to the door body about the door-side end portion of the second door rail support member, and is capable of rotating with respect to the vehicle body about the vehicle body-side end portion of the second door rail support member. Accordingly, through the second door rail and the second door rail support member, the door body is supported with respect to the vehicle body so as to be capable of performing the swing operation and the slide operation. The support stability of the door body is thus improved.

Moreover, the vertical coupling member couples the door-side end portion of the second door rail support member and the door-side end portion of the door rail support member together along the vertical direction. Accordingly, since the operation of the door rail support member and the operation of the second door rail support member are coupled, even greater stability can be achieved in the operation of the door body.

A sliding door structure of an eighth aspect of the present invention is any one of the first aspect to the seventh aspect, further including a second vehicle body rail support member and a front-rear coupling member. The second vehicle body rail support member is configured to include a vehicle body-side end portion coupled to the vehicle body rail and capable of moving along the vehicle body rail, and a door-side end portion coupled to the door body at a position further toward a door-opening direction side than a position where the door-side end portion of the vehicle body rail support member is coupled to the door body, that is capable of rotating with respect to the vehicle body about the vehicle body-side end portion of the second vehicle body rail support member, and that is capable of rotating with respect to the door body about the door-side end portion of the second vehicle body rail support member. The front-rear coupling member couples the vehicle body-side end portion of the vehicle body rail support member and the vehicle body-side end portion of the second vehicle body rail support member together in the door opening-and-closing direction.

In the eighth aspect, the second vehicle body rail support member is provided separately to the vehicle body rail support member. Similarly to the vehicle body rail support member, the second vehicle body rail support member is configured including the vehicle body-side end portion coupled to the vehicle body rail and capable of moving along the vehicle body rail, and the door-side end portion coupled to the door body. The second vehicle body rail support member is capable of rotating with respect to the vehicle body about the vehicle body-side end portion of the second vehicle body rail support member, and is capable of rotating with respect to the door body about the door-side end portion of the second vehicle body rail support member. The position where the door-side end portion of the second vehicle body rail support member is coupled to the door body is a position further to the door-opening direction side than the position where the door-side end portion of the vehicle body rail support member is coupled to the door body.

Moreover, the front-rear coupling member is also provided. The front-rear coupling member couples the vehicle body-side end portion of the vehicle body rail support member and the vehicle body-side end portion of the second vehicle body rail support member together in the door opening-and-closing direction. The operation of the vehicle body rail support member and the second vehicle body rail support member is thereby coupled, thus enabling even greater stability in the operation of the door body.

A sliding door structure of a ninth aspect of the present invention is any one of the first aspect to the eighth aspect, wherein a position where the door-side end portion of the vehicle body rail support member that is coupled to the door body is further toward a door-closing direction side than a position of the center of gravity of the door, and a position of the door-side end portion of the door rail support member when in a fully open state is further toward the door-closing direction side than the position of the center of gravity of the door, and further toward a door-opening direction side than a position where the door-side end portion of the vehicle body rail support member is coupled to the door body. The sliding door structure further includes a reaction force generation portion and a tilt suppressing wall. The reaction force generation portion is provided to the vehicle body rail support member. The tilt suppressing wall is provided to the vehicle body, and is configured such that the reaction force generation portion contacts the tilt suppressing wall from below in the vehicle body at least when in the fully open state.

Note that the "position of the center of gravity of the door" refers to the position of the center of gravity of the overall door, including not only the door body but also the door rail. Namely, the "position of the center of gravity of the door" is the position of the center of gravity of the all of the members supported with respect to the vehicle body through the vehicle body rail support member and the door rail support member (not including the vehicle body rail support member and the door rail support member).

In the ninth aspect, the position where the door-side end portion of the vehicle body rail support member is coupled to the door body is further toward the door-closing direction side than the position of the center of gravity of the door. Moreover, the position of the door-side end portion of the door rail support member when in the fully open state is further toward the door-closing direction side than the position of the center of gravity of the door. Namely, in the fully open state, the door-side end portion of the vehicle body rail support member and the door-side end portion of the door rail support member are positioned further to the door-closing direction side than the position of the center of gravity of the door. Accordingly, in the fully open state, a state exists in which the door body is supported by the vehicle body rail support member and the door rail support member only on the door-closing direction side of the position of the center of gravity of the door. Accordingly, the door body has a tendency to tilt under its own weight in a manner that would cause a door-opening direction side end section of the door body to descend.

Moreover, in the fully open state, the position of the door-side end portion of the door rail support member is further to the door-opening direction side than the position where the door-side end portion of the vehicle body rail support member is coupled to the door body. Accordingly, when the door body tilts in the manner described above, a vehicle upward force acts on the door-side end portion of the vehicle body rail support member.

In the ninth aspect, the reaction force generation portion is provided to the vehicle body rail support member, and the tilt suppressing wall is provided to the vehicle body. The tilt suppressing wall is configured such that the reaction force generation portion of the vehicle body rail support member contacts the tilt suppressing wall from below in the vehicle body at least when in the fully open state.

Accordingly, at least when in the fully open state, when the door body attempts to tilt as described above, the reaction force generation portion of the vehicle body rail support member contacts the tilt suppressing wall from below in the vehicle body, and receives the vehicle downward reaction force. The door body is thereby suppressed from titling.

BRIEF DESCRIPTION OF THE DRAWINGS

Exemplary embodiments of the present invention will be described in detail based on the following figures, wherein:

FIG. 5 is a side view illustrating the fully open state illustrated in FIG. 4 as when viewing a side face of the vehicle.

FIG. 11 is an enlarged perspective view illustrating the vicinity of a vehicle body-side end portion of a rear vehicle body rail support member.

FIG. 14 is a cross-section taken along the length direction of an upper door rail support member (a cross-section along line 14-14 in FIG. 13).

FIG. 15A is a schematic plan view illustrating operation of a swing-and-slide drive mechanism when in a fully closed state.

FIG. 15B is a schematic plan view illustrating operation of a swing-and-slide drive mechanism when in a swing operation state.

FIG. 15C is a schematic plan view illustrating operation of a swing-and-slide drive mechanism when in a borderline state.

FIG. 15D is a schematic plan view illustrating operation of a swing-and-slide drive mechanism when in a slide operation state.

DETAILED DESCRIPTION

Explanation follows regarding a sliding door structure S1 according to an exemplary embodiment of the present invention, with reference to the drawings.

Note that in the respective drawings, the arrow FR indicates the front of a vehicle, the arrow RR indicates rear of the vehicle, the arrow UP indicates upward in the vehicle, and the arrow IN indicates a vehicle width direction inner side. Moreover, in the following explanation, unless specifically stated otherwise, front, rear, upward, downward, inward, and outward directions refer to the front and rear in a vehicle front-rear direction, upward and downward in a vehicle vertical direction, and inward and outward in the vehicle width direction.

Figure 16:
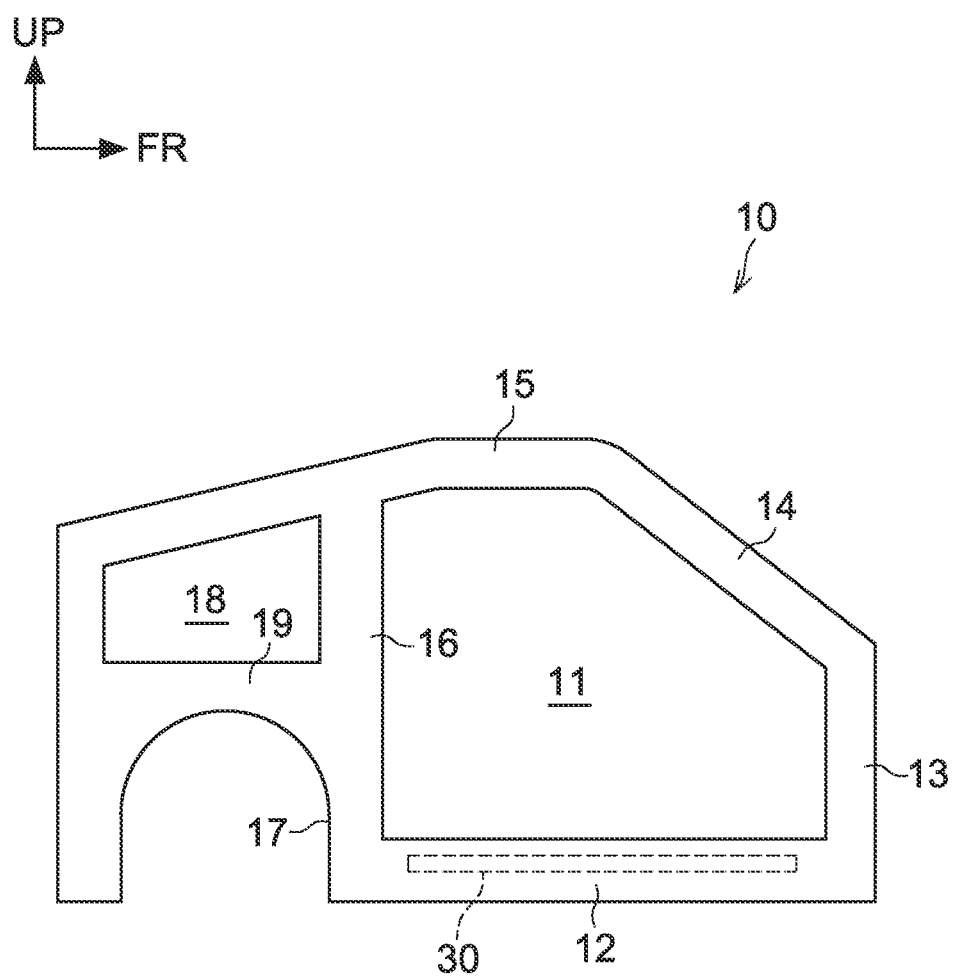
FIG. 16 is a side view of a vehicle body of an exemplary embodiment, as when viewing a right side face of the vehicle.

FIG. 16 schematically illustrates a right side face of a vehicle body 10. As illustrated in FIG. 16, the side face of the vehicle body 10 is provided with a door opening 11 through which an occupant boards and alights. A door body 20 (not illustrated in FIG. 16), described later, is attached to the vehicle body 10 to enable opening and closing of the door opening 11. In the present exemplary embodiment, the door opening 11 is configured as a large opening, provided for not only an occupant of a front seat, but also an occupant of a rear seat, to board and alight. The door body 20 is large in size, such that the door opening 11 can be opened and closed by a single door.

A rocker 12 extending in the vehicle front-rear direction is provided below the door opening 11. A front pillar lower 13 is provided extending upward from a front end of the rocker 12 at the front of the door opening 11. A front pillar upper 14 is provided extending from an upper end of the front pillar lower 13 at an upward incline and toward the rear. A roof-side rail 15 is provided extending toward the rear from an upper end of the front pillar upper 14. Moreover, a rear pillar 16 is provided extending upward from a rear end of the rocker 12. An upper end of the rear pillar 16 is connected to the roof-side rail 15.

A rear wheelhouse 17 in which a rear tire (not illustrated in the drawings) is disposed is provided at the rear of the rocker 12. A window 18 is provided above the rear wheelhouse 17. The window 18 is positioned to the rear of an upper portion of the door opening 11, and the rear wheelhouse 17 is positioned to the rear of a lower portion of the door opening 11. An under-window portion 19 is provided extending from a vertical direction intermediate portion of the rear pillar 16 toward the rear between the rear wheelhouse 17 and the window 18.

FIG. 1 to FIG. 4 are perspective views schematically illustrating the sliding door structure S1.

Figure 1:
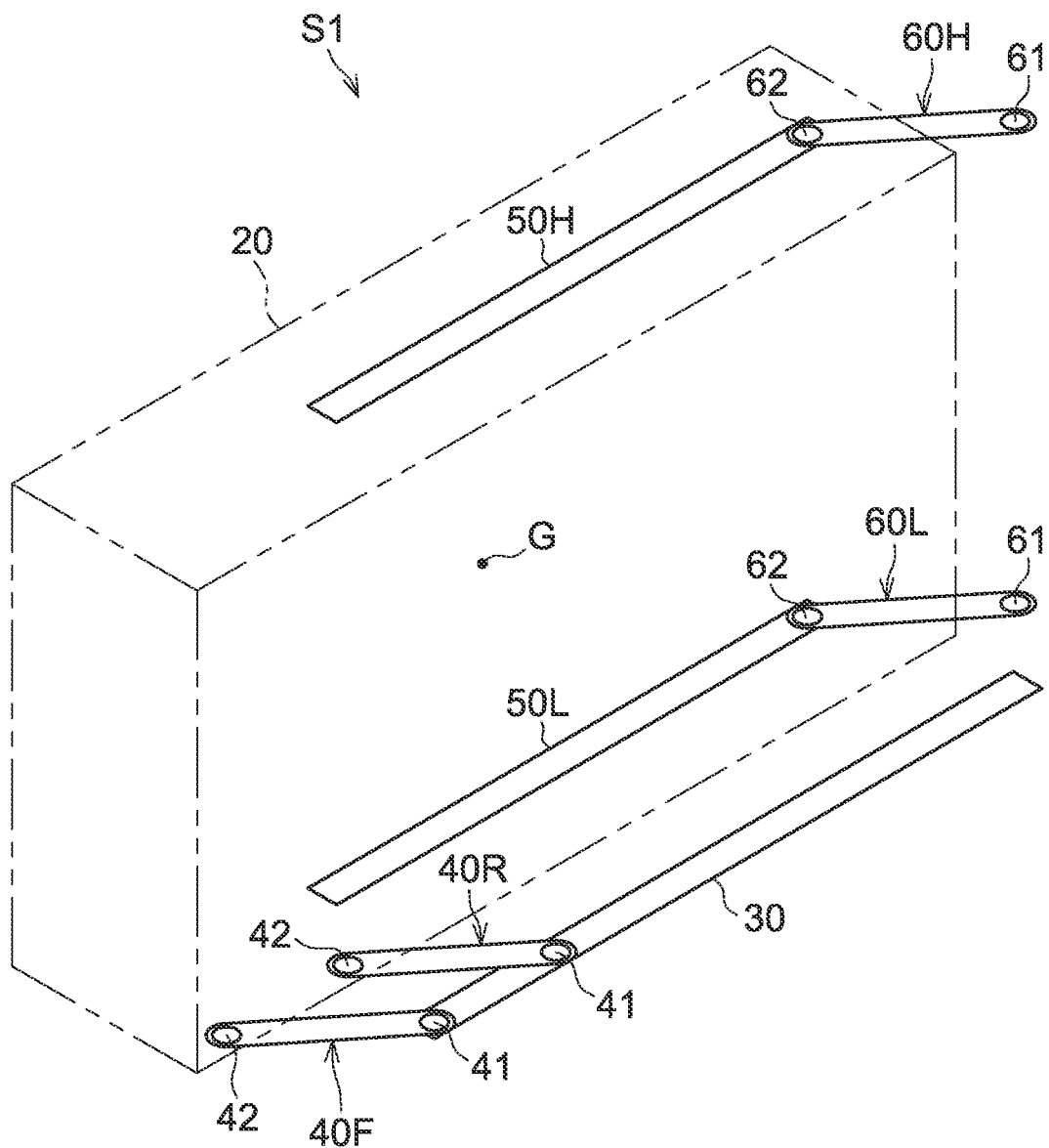
FIG. 1 is a schematic perspective view illustrating a fully closed state of a sliding door structure of an exemplary embodiment.

Note that the door body 20 illustrated by double-dotted dashed lines in FIG. 1 represents a part excluding a window of the overall door that covers the door opening 11 in FIG. 16. Accordingly, an upper portion of the door body 20 in the following explanation corresponds to a portion in the vicinity of a door belt line.

The sliding door structure S1 of the present exemplary embodiment is opened by moving the door body 20 toward the vehicle rear, and is closed by moving the door body 20 toward the vehicle front. Accordingly, in the present exemplary embodiment, a direction toward the vehicle front corresponds to a "door-closing direction", and a direction toward the vehicle rear corresponds to a "door-opening direction".

As illustrated in FIG. 1 to FIG. 4, the sliding door structure S1 is configured including a vehicle body rail 30, two vehicle body rail support members 40F, 40R, two door rails 50H, 50L, and two door rail support members 60H, 60L.

Note that in the following explanation, the two vehicle body rail support members 40F, 40R are referred to simply as the vehicle body rail support members 40 when not specifically indicating which one is being referred to. This point similarly applies to the two door rails 50H, 50L, and the two door rail support members 60H, 60L.

<Vehicle Body Rail>

The vehicle body rail 30 is provided to the vehicle body 10, and more specifically, the vehicle body rail 30 is provided to the rocker 12 (see FIG. 16) configuring a lower side of the door opening 11. The vehicle body rail 30 extends in the vehicle front-rear direction in a straight line shape. The range in which the vehicle body rail 30 extends in the front-rear direction is contained within a front-rear direction range in which the door opening 11 extends.

<Vehicle Body Rail Support Members>

A vehicle body-side end portion 41 of each of the two vehicle body rail support members 40F, 40R is coupled to the vehicle body rail 30 so as to be capable of moving in the vehicle front-rear direction along the vehicle body rail 30. A door-side end portion 42 of each of the two vehicle body rail support members 40F, 40R is coupled to the door body 20. Moreover, the two vehicle body rail support members 40F, 40R are both capable of rotating with respect to the vehicle body 10 about a vertical direction axis centered on the vehicle body-side end portion 41, and are also capable of rotating with respect to the door body 20 about a vertical direction axis centered on the door-side end portion 42.

Of the two vehicle body rail support members 40F, 40R, the position where the door-side end portion 42 of the vehicle body rail support member (referred to below as the "front vehicle body rail support member") 40F at the front is coupled to the door body 20 is in the vicinity of a front end of the door body 20. The position where the door-side end portion 42 of the vehicle body rail support member (referred to below as the "rear vehicle body rail support member") 40R at the rear is coupled to the door body 20 is a position further toward the rear than the position where the door-side end portion 42 of the front vehicle body rail support member 40F is coupled in the vicinity of the front end of the door body 20. The positions where the door-side end portions 42, 42 of the two vehicle body rail support members 40F, 40R are coupled to the door body 20 are both positions further toward the front than a position G of the center of gravity of the door.

Note that the position G of the center of gravity of the door refers to the position of the center of gravity of the overall door, including not only the door body 20 but also the two door rails 50H, 50L. Namely, the position G of the center of gravity is the position of the center of gravity of the all of the members supported with respect to the vehicle body 10 through the vehicle body rail support members 40 and the door rail support members 60 (but not including the vehicle body rail support members 40 and the door rail support members 60).

<Door Rail>

The two door rails 50H, 50L are both provided to the door body 20, and extend in straight line shapes along the vehicle front-rear direction. Of the two door rails 50H, 50L, one is provided in the vicinity of the belt line, this being an upper portion of the door body 20, and the other is provided at a position at the same height as the vehicle body rail 30, this being a lower portion of the door body 20. The door rail 50 provided at the upper portion of the door body 20 is referred to as the upper door rail 50H, and the door rail 50 provided at the lower portion of the door body 20 is referred to as the lower door rail 50L.

<Door Rail Support Members>

Out of the two door rail support members 60H, 60L, an upper door rail support member 60H is provided to the upper door rail 50H, and a lower door rail support member 60L is provided to the lower door rail 50L. A vehicle body-side end portion 61 of each of the two door rail support members 60H, 60L is coupled to the vehicle body 10, and a door-side end portion 62 of each of the two door rail support members 60H, 60L is coupled to the corresponding door rail 50, such that the two door rail support members 60H, 60L are capable of moving along the door rails 50 in the vehicle front-rear direction. The two door rail support members 60H, 60L are both capable of rotating with respect to the vehicle body 10 about a vertical direction axis centered on the vehicle body-side end portion 61, and are capable of rotating with respect to the door body 20 about a vertical direction axis centered on the door-side end portion 62.

The positions where the vehicle body-side end portions 61 of the two door rail support members 60H, 60L are coupled to the vehicle body 10 are both to the rear of the door opening 11. Specifically, the vehicle body-side end portion 61 of the upper door rail support member 60H is coupled to a front end portion of the under-window portion 19, this being at a vertical direction intermediate portion of the rear pillar 16, and the vehicle body-side end portion 61 of the lower door rail support member 60L is coupled to a rear end portion of the rocker 12, this being at a lower end portion of the rear pillar 16 (see FIG. 16).

Next, explanation follows regarding basic operation of the sliding door structure S1.

(Fully Closed State)

Figure 6A:
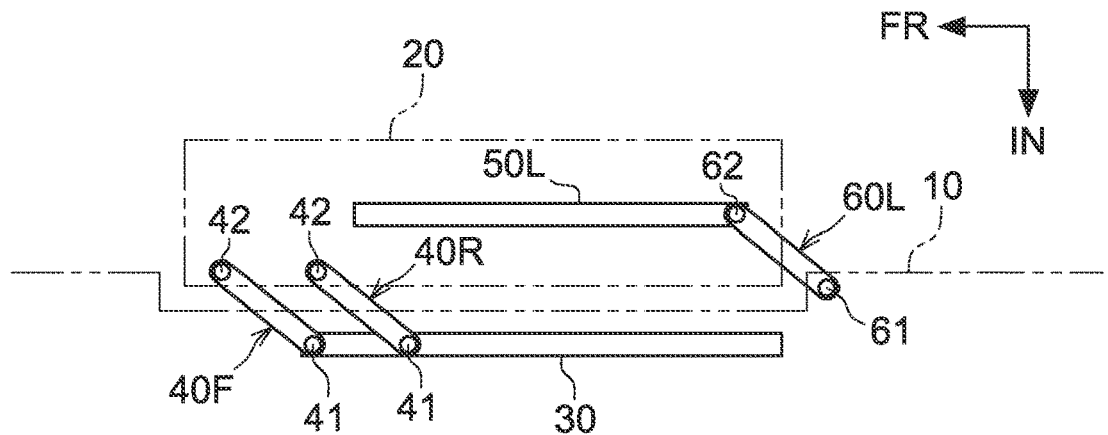
FIG. 6A is a schematic plan view illustrating a lower section of a sliding door structure of an exemplary embodiment when in a fully closed state.
Figure 7A:
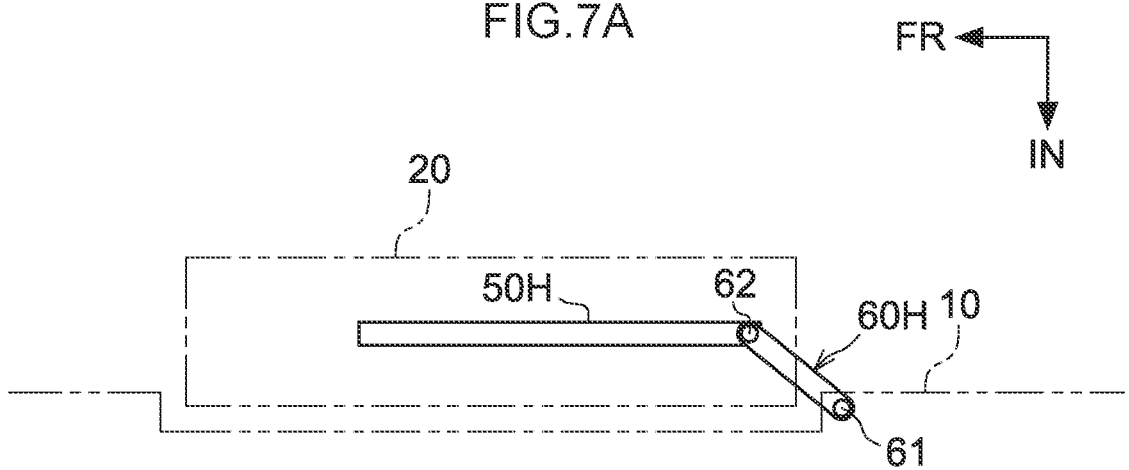
FIG. 7A is a schematic plan view illustrating an upper section of a sliding door structure of an exemplary embodiment when in a fully closed state.

FIG. 1, FIG. 6A, and FIG. 7A illustrate a state in which the door body 20 has fully closed the door opening 11 (referred to below as the "fully closed state").

As illustrated in FIG. 1, FIG. 6A, and FIG. 7A, in the fully closed state, the vehicle body-side end portion 41 of the front vehicle body rail support member 40F is positioned at a front end portion of the vehicle body rail 30, and the door-side end portion 62 of the upper door rail support member 60H is positioned at a rear end portion of the upper door rail 50H. Moreover, the door-side end portion 62 of the lower door rail support member 60L is positioned at a rear end portion of the lower door rail 50L.

Moreover, in the fully closed state, the two vehicle body rail support members 40 and the two door rail support members 60 are each angled with respect to the vehicle width direction. Specifically, the door-side end portions 42 of the vehicle body rail support members 40 are positioned further toward the vehicle front than the vehicle body-side end portions 41 of the vehicle body rail support members 40, and the door-side end portions 62 of the door rail support members 60 are positioned further toward the vehicle front than the vehicle body-side end portions 61 of the door rail support members 60.

(Borderline State)

Figure 2:
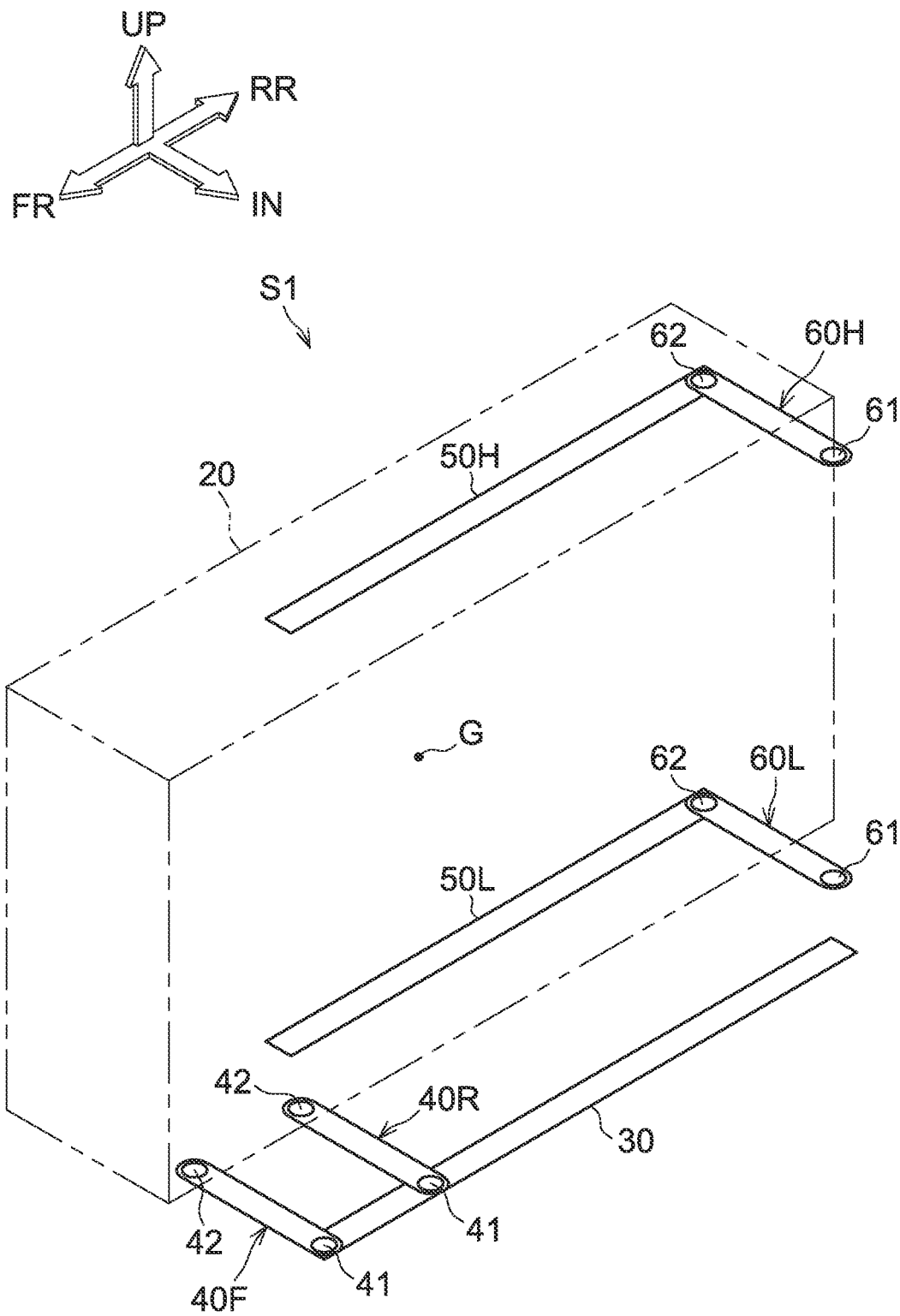
FIG. 2 is a schematic perspective view illustrating a borderline state of a sliding door structure of an exemplary embodiment.
Figure 6B:
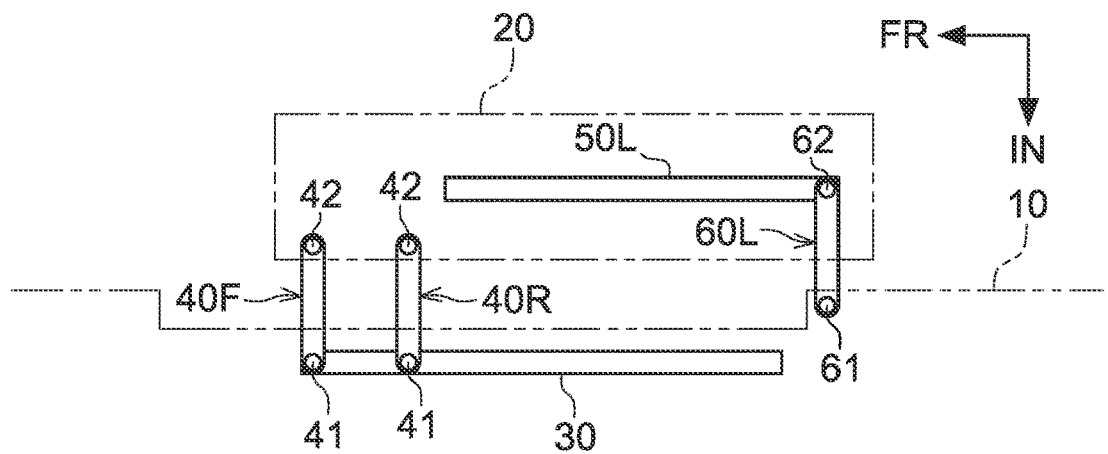
FIG. 6B is a schematic plan view illustrating a lower section of a sliding door structure of an exemplary embodiment when in a borderline state.
Figure 6C:
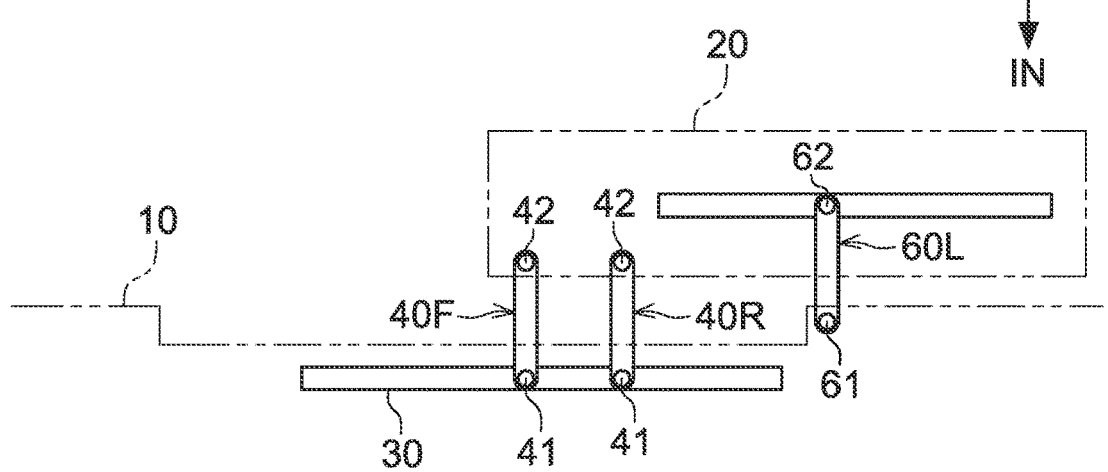
FIG. 6C is a schematic plan view illustrating a lower section of a sliding door structure of an exemplary embodiment when in a slide operation state.
Figure 7B:
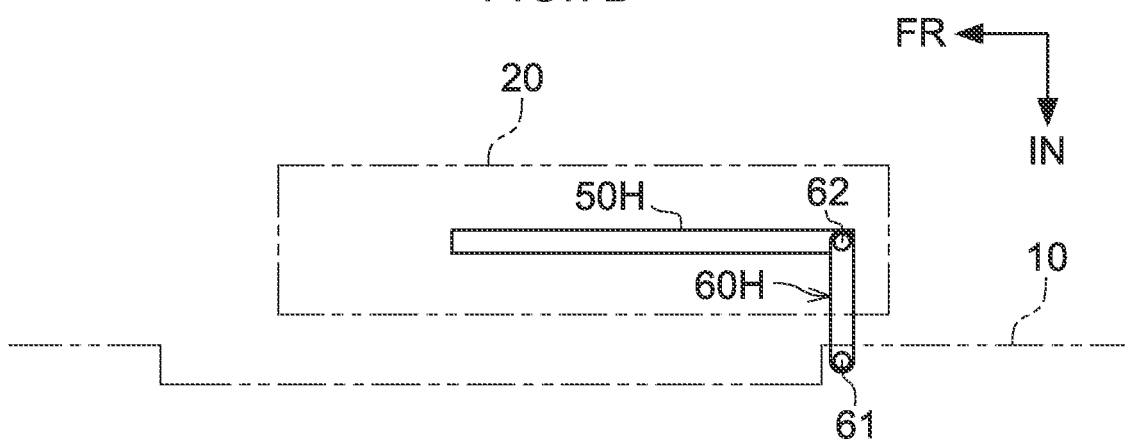
FIG. 7B is a schematic plan view illustrating an upper section of a sliding door structure of an exemplary embodiment when in a borderline state.
Figure 7C:
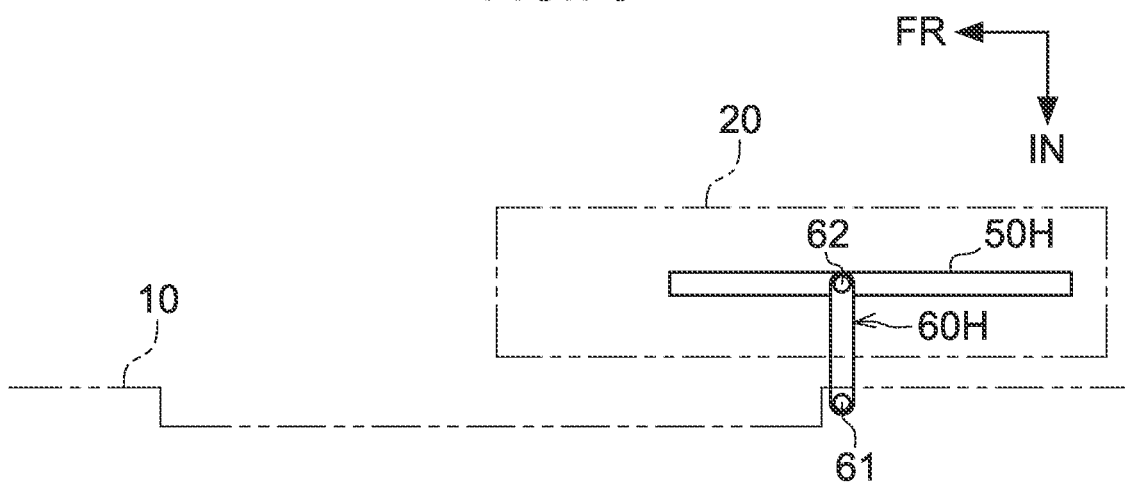
FIG. 7C is a schematic plan view illustrating an upper section of a sliding door structure of an exemplary embodiment when in a slide operation state.

FIG. 2, FIG. 6B, and FIG. 7B illustrate a borderline state.

As illustrated in FIG. 2, FIG. 6B, and FIG. 7B, in the borderline state, similarly to in the fully closed state, the vehicle body-side end portion 41 of the front vehicle body rail support member 40F is positioned at the front end portion of the vehicle body rail 30, and the door-side end portion 62 of the upper door rail support member 60H is positioned at the rear end portion of the upper door rail 50H. Moreover, the door-side end portion 62 of the lower door rail support member 60L is positioned at the rear end portion of the lower door rail 50L.

Moreover, in the borderline state, unlike in the fully closed state, the two vehicle body rail support members 40 and the two door rail support members 60 each run along the vehicle width direction. Specifically, the positions of the door-side end portions 42 of the vehicle body rail support members 40 and the vehicle body-side end portions 41 of the vehicle body rail support members 40 are aligned in the vehicle front-rear direction, and the positions of the door-side end portions 62 of the door rail support members 60 and the vehicle body-side end portions 61 of the door rail support members 60 are aligned in the vehicle front-rear direction.

(Swing Operation: From the Fully Closed State to the Borderline State)

The borderline state illustrated in FIG. 2 is achieved by the vehicle body rail support members 40 and the door rail support members 60 rotating with respect to the vehicle body 10 from the fully closed state illustrated in FIG. 1.

Namely, the vehicle body rail support members 40 rotate with respect to the vehicle body 10 about their vehicle body-side end portions 41, and the door rail support members 60 rotate with respect to the vehicle body 10 about their vehicle body-side end portions 61, without the vehicle body-side end portions 41 of the vehicle body rail support members 40 moving along the vehicle body rail 30, and without the door-side end portions 62 of the door rail support members 60 moving along the door rail 50. Note that at the same time as this occurs, the vehicle body rail support members 40 rotate with respect to the door body 20 about their door-side end portions 42, and the door rail support members 60 rotate with respect to the door body 20 about their door-side end portions 62.

This operation from the fully closed state to the borderline state is referred to as a swing operation, and a state between the fully closed state and the borderline state is referred to as a swing operation state. Note that the borderline state refers to a state that is borderline between the state in which the door body 20 performs the swing operation (swing operation state), and a state in which the door body 20 performs a slide operation (slide operation state), described later.

By performing the swing operation from the fully closed state to the borderline state, the door body 20 moves as if to describe a circular arc shape. The door body 20 thereby moves away from the vehicle body 10 toward a vehicle width direction outer side.

(Fully Open State)

Figure 4:
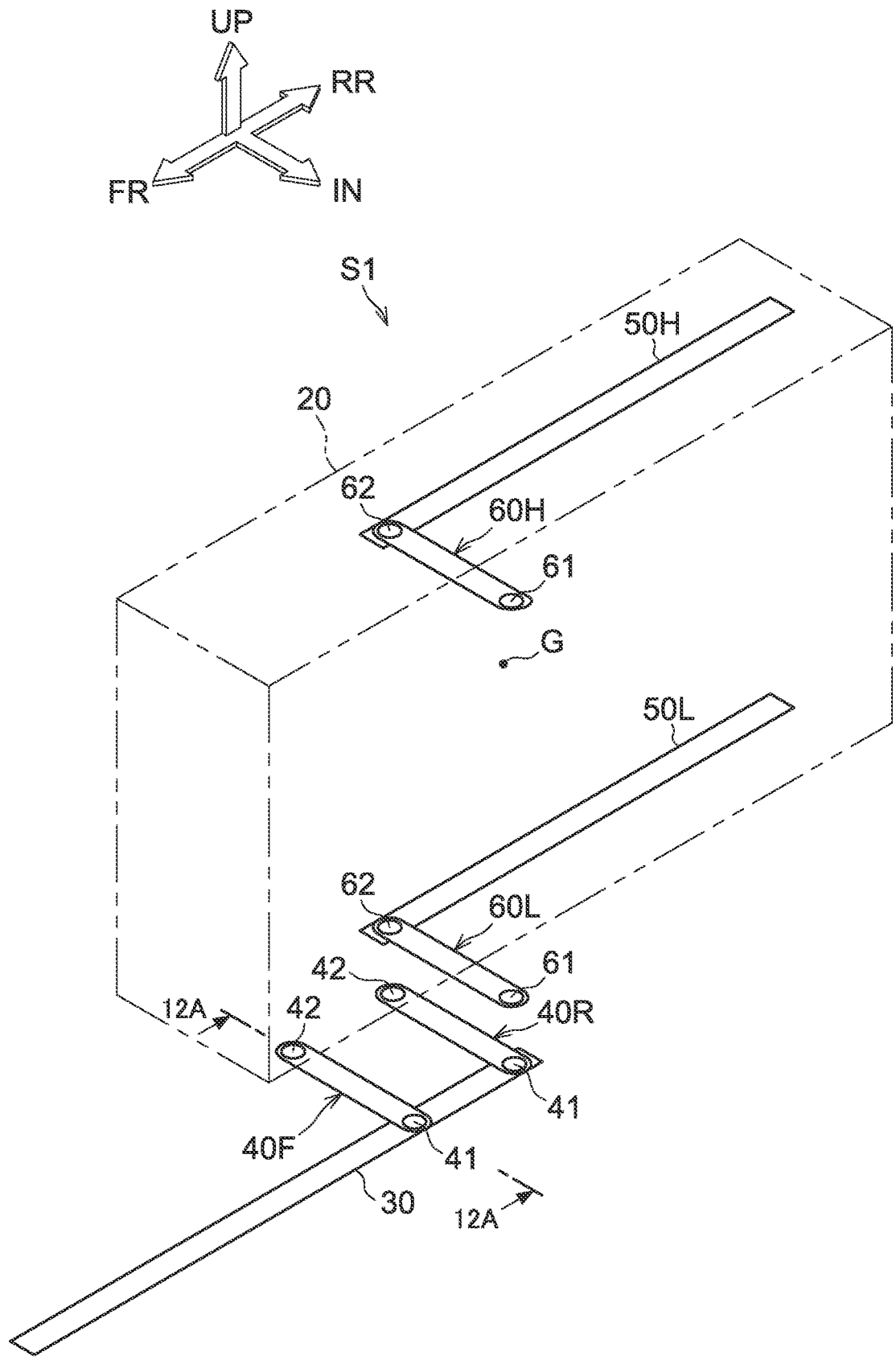
FIG. 4 is a schematic perspective view illustrating a fully open state of a sliding door structure of an exemplary embodiment.

FIG. 4 and FIG. 5 illustrate a fully open state.

As illustrated in FIG. 4 and FIG. 5, in the fully open state, the vehicle body-side end portion 41 of the rear vehicle body rail support member 40R is positioned at a rear end portion of the vehicle body rail 30, and the door-side end portion 62 of the upper door rail support member 60H is positioned at a front end portion of the upper door rail 50H. Moreover, the door-side end portion 62 of the lower door rail support member 60L is positioned at a front end portion of the lower door rail 50L.

Moreover, in the fully open state, similarly to in the borderline state, the two vehicle body rail support members 40 and the two door rail support members 60 each run along the vehicle width direction. Specifically, the positions of the door-side end portions 42 of the vehicle body rail support members 40 and the vehicle body-side end portions 41 of the vehicle body rail support members 40 are aligned in the vehicle front-rear direction. Moreover, the positions of the door-side end portions 62 of the door rail support members 60 and the vehicle body-side end portions 61 of the door rail support members 60 are aligned in the vehicle front-rear direction.

(Slide Operation: From the Borderline State to the Fully Open State)

Figure 3:
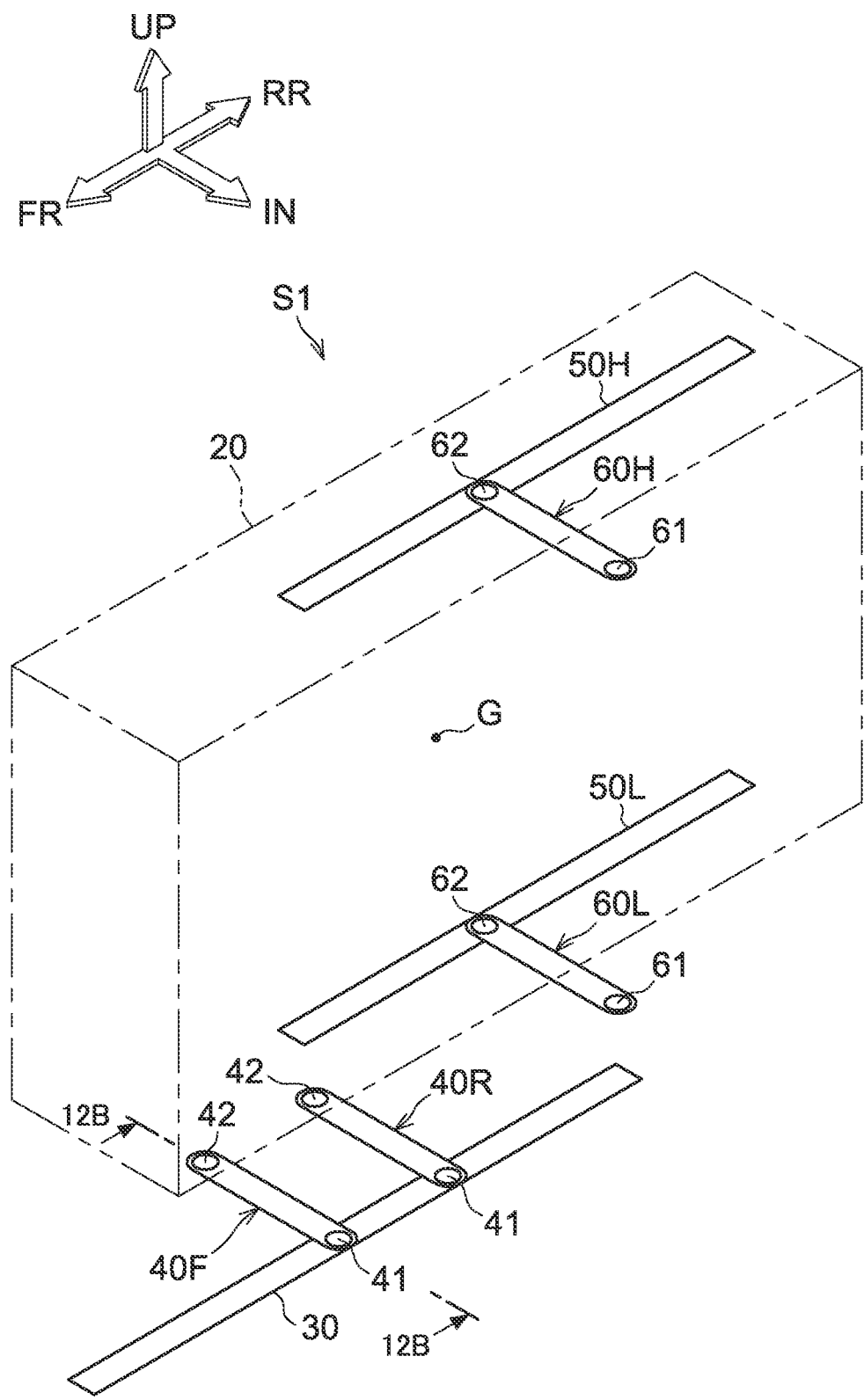
FIG. 3 is a schematic perspective view illustrating a slide operation state of a sliding door structure of an exemplary embodiment.

From the borderline state illustrated in FIG. 2, the fully open state illustrated in FIG. 4 is achieved by the vehicle body-side end portions 41 of the vehicle body rail support members 40 moving along the vehicle body rail 30, and the door-side end portions 62 of the door rail support members 60 moving along the door rail 50, via the state illustrated in FIG. 3.

Namely, the vehicle body-side end portions 41 of the vehicle body rail support members 40 move along the vehicle body rail 30 and the door-side end portions 62 of the door rail support members 60 move along the door rail 50 without the vehicle body rail support members 40 or the door rail support members 60 rotating with respect to the vehicle body 10 or the door body 20.

The operation from the borderline state to the fully open state is referred to as the slide operation, and a state between the borderline state and the fully open state is referred to as a slide operation state.

The operation of the sliding door structure S1 described above may be implemented using, for example, a slide restriction mechanism M1, a swing restriction mechanism M2, a solenoid swing restriction mechanism M4, and the like, described later.

<Specific Configuration in the Vicinity of the Vehicle Body Rail Support Members>

Figure 8:
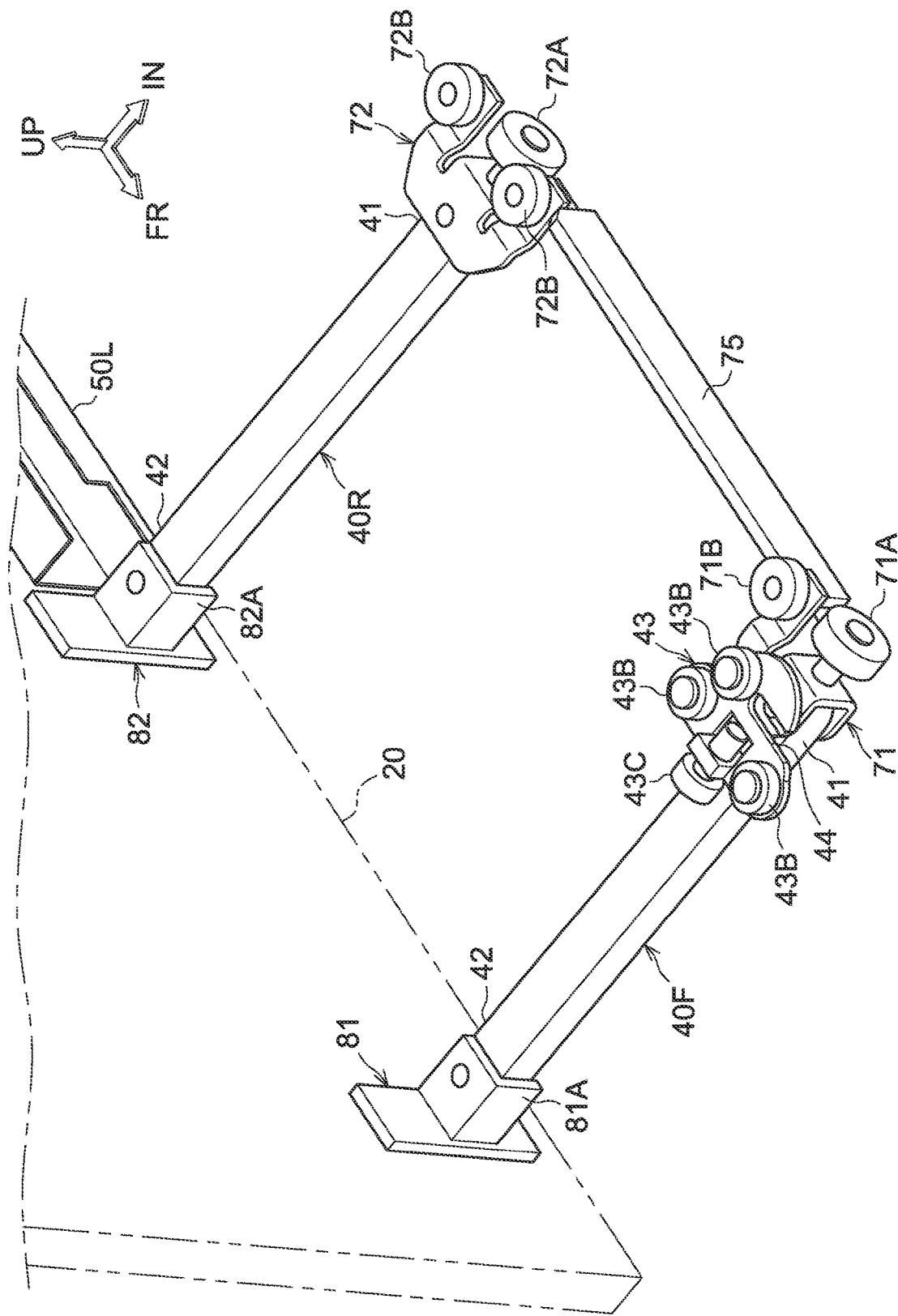
FIG. 8 is an enlarged perspective view illustrating the vicinity of a front vehicle body rail support member and a rear vehicle body rail support member.

Next, explanation follows regarding specific configuration in the vicinity of the vehicle body rail support members 40. FIG. 8 illustrates an enlargement of configuration in the vicinity of the front vehicle body rail support member 40F and the rear vehicle body rail support member 40R.

As illustrated in FIG. 8, a front coupling member 81 is fixed in the vicinity of a front end of the door body 20. The door-side end portion 42 of the front vehicle body rail support member 40F is rotatably connected to the front coupling member 81. The door-side end portion 42 of the front vehicle body rail support member 40F is thereby coupled to the door body 20 through the front coupling member 81. The front vehicle body rail support member 40F is capable of rotating with respect to the door body 20 about the door-side end portion 42.

A rear coupling member 82 is fixed to a position in the vicinity of the front end of the door body 20 and further toward the vehicle front-rear direction rear than the position where the front coupling member 81 is fixed. The door-side end portion 42 of the rear vehicle body rail support member 40R is rotatably connected to the rear coupling member 82. The door-side end portion 42 of the rear vehicle body rail support member 40R is thereby coupled to the door body 20 through the rear coupling member 82, and the rear vehicle body rail support member 40R is capable of rotating with respect to the door body 20 about the door-side end portion 42.

The front coupling member 81 and the rear coupling member 82 are configured including respective front walls 81A, 82A. In the state illustrated in FIG. 8, both the front vehicle body rail support member 40F and the rear vehicle body rail support member 40R are running along the vehicle width direction, and in this state, the front vehicle body rail support member 40F contacts the front wall 81A, and the rear vehicle body rail support member 40R contacts the front wall 82A. The rotation angle range of the vehicle body rail support members 40F, 40R with respect to the door body 20 is thereby restricted.

(Vehicle Body Rail Slide Members)

A front vehicle body rail slide member 71 is rotatably attached to the vehicle body-side end portion 41 of the front vehicle body rail support member 40F. The front vehicle body rail support member 40F is capable of rotating with respect to the front vehicle body rail slide member 71 about an axis in the vehicle vertical direction.

The front vehicle body rail slide member 71 includes a single horizontal axis roller 71A with an axial direction along the vehicle width direction, and a single vertical axis roller 71B with an axial direction along the vertical direction. As illustrated in FIG. 12, the horizontal axis roller 71A is disposed so as to contact a lower wall 30L of the vehicle body rail 30 from above in the vehicle, and the vertical axis roller 71B is disposed inside a groove-shaped rail 31 opening downward in the vehicle. The groove-shaped rail 31 extends in a straight line shape along the vehicle front-rear direction, and configures part of the vehicle body rail 30. The front vehicle body rail slide member 71 is thereby capable of moving along the vehicle body rail 30 in the vehicle front-rear direction.

Through the front vehicle body rail slide member 71, the vehicle body-side end portion 41 of the front vehicle body rail support member 40F is thus coupled to the vehicle body rail 30 and is also rendered capable of moving along the vehicle body rail 30. Moreover, the front vehicle body rail support member 40F is capable of rotating with respect to the vehicle body 10 about the vehicle body-side end portion 41.

A rear vehicle body rail slide member 72 is rotatably attached to the vehicle body-side end portion 41 of the rear vehicle body rail support member 40R. The rear vehicle body rail support member 40R is capable of rotating with respect to the rear vehicle body rail slide member 72 about an axis in the vehicle vertical direction.

The rear vehicle body rail slide member 72 includes a single horizontal axis roller 72A with an axial direction along the vehicle width direction, and two vertical axis rollers 72B each with an axial direction along the vertical direction. Although not illustrated in the drawings, the horizontal axis roller 72A is disposed so as to contact the lower wall 30L of the vehicle body rail 30 (see FIG. 12) from above in the vehicle, and the two vertical axis rollers 72B are disposed inside the groove-shaped rail 31. The rear vehicle body rail slide member 72 is thereby capable of moving along the vehicle body rail 30 in the vehicle front-rear direction. Moreover, the rear vehicle body rail slide member 72 is configured so as to move while maintaining its orientation with respect to the vehicle body rail 30 as the rear vehicle body rail slide member 72 moves along the vehicle body rail 30.

Through the rear vehicle body rail slide member 72, the vehicle body-side end portion 41 of the rear vehicle body rail support member 40R is thus coupled to the vehicle body rail 30 and is rendered capable of moving along the vehicle body rail 30. Moreover, the rear vehicle body rail support member 40R is capable of rotating with respect to the vehicle body 10 about the vehicle body-side end portion 41.

Moreover, a front-rear coupling member 75 is provided to couple the front vehicle body rail slide member 71 and the rear vehicle body rail slide member 72 together along the vehicle front-rear direction. A constant distance is thus maintained between the front vehicle body rail slide member 71 and the rear vehicle body rail slide member 72, and the front vehicle body rail support member 40F and the rear vehicle body rail support member 40R are maintained in a parallel relationship to each other at all times.

(Add-on Member)

Figure 9:
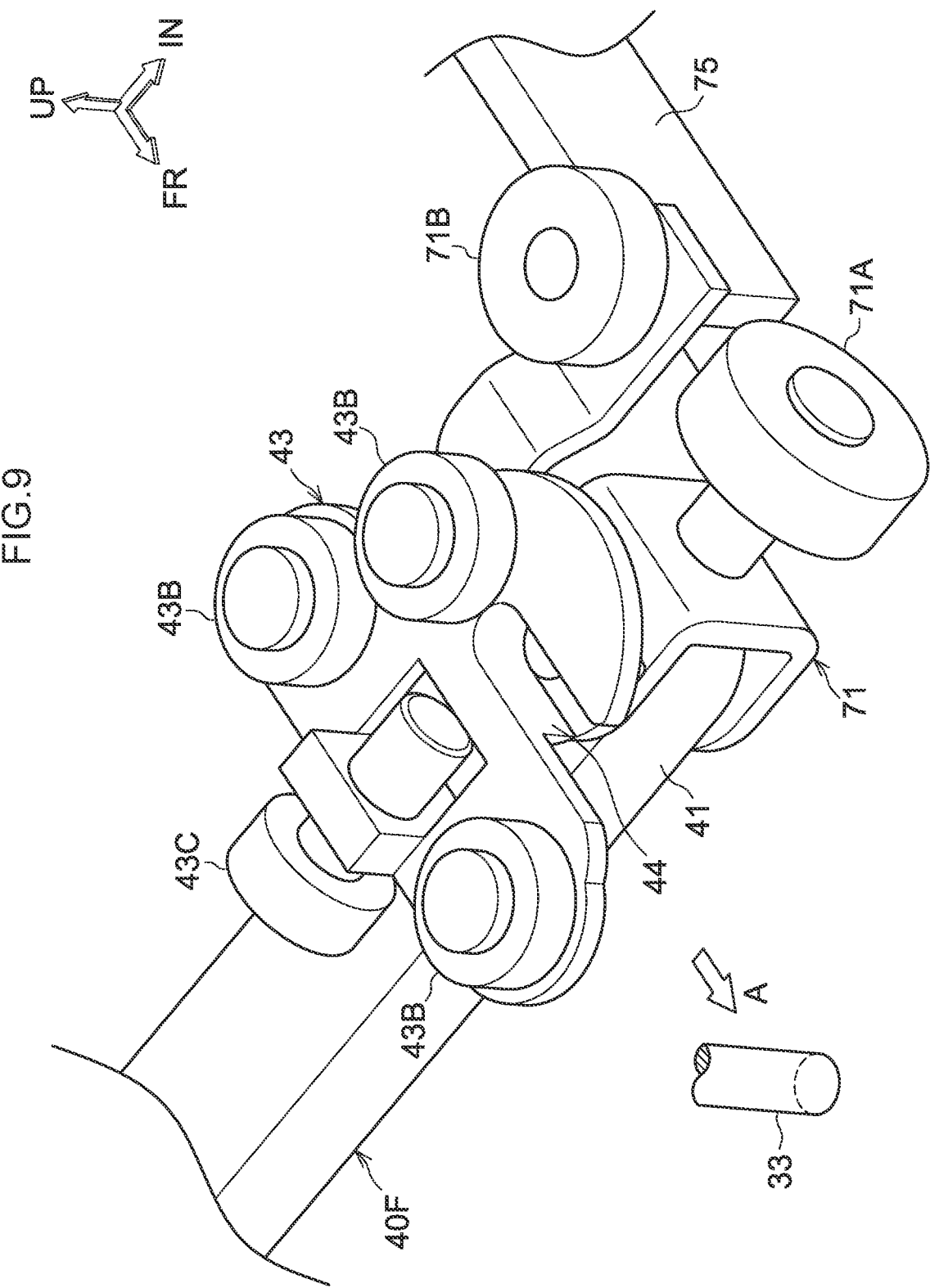
FIG. 9 is an enlarged perspective view illustrating the vicinity of a vehicle body-side end portion of a front vehicle body rail support member.

As illustrated in FIG. 9, an add-on member 43 is provided above the vehicle body-side end portion 41 of the front vehicle body rail support member 40F. The add-on member 43 is fixed to the front vehicle body rail support member 40F, and moves as a unit together with the front vehicle body rail support member 40F. For example, when the front vehicle body rail support member 40F rotates with respect to the front vehicle body rail slide member 71, the add-on member 43 also rotates with respect to the front vehicle body rail slide member 71.

The add-on member 43 includes an opening 44. An opening direction A of the opening 44 faces toward the front in the vehicle front-rear direction when in the state illustrated in FIG. 9, namely a state in which the length direction of the vehicle body rail support members 40 runs along the vehicle width direction. The opening 44 is a portion into which a column 33, described later, intrudes, and that works together with the column 33 to achieve a function of restricting movement of the front vehicle body rail support member 40F along the vehicle body rail 30. This point will be described later (slide restriction mechanism M1).

Moreover, the add-on member 43 includes three vertical axis rollers 43B, each having an axial direction in the vertical direction, serving as a "rotation restricting rail contact portion". The three vertical axis rollers 43B work together with a rotation restricting rail 32 (see FIG. 10A to FIG. 10C), described later, to achieve a function of restricting rotation of the front vehicle body rail support member 40F with respect to the vehicle body 10. This point will be described later (with regard to a swing restriction mechanism M2).

The add-on member 43 also includes a horizontal axis roller 43C, serving as a "reaction force generation portion". The horizontal axis roller 43C is a roller with an axial direction in a direction running parallel to the length direction of the front vehicle body rail support member 40F, and works together with an upper wall 30H of the vehicle body rail 30 (see FIG. 12A, FIG. 12B), described later, to achieve a function of suppressing tilting of the door body 20 when in the fully open state. This point will be described later (tilting suppression mechanism M3).

<Slide Restriction Mechanism and Swing Restriction Mechanism>

Figure 10A:
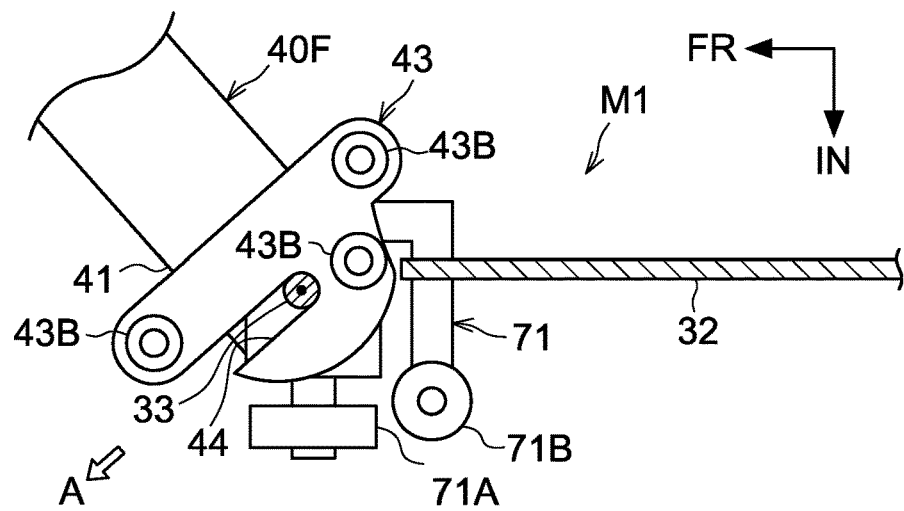
FIG. 10A is a plan view illustrating a slide restriction mechanism and a swing restriction mechanism when in a fully closed state.
Figure 10B:
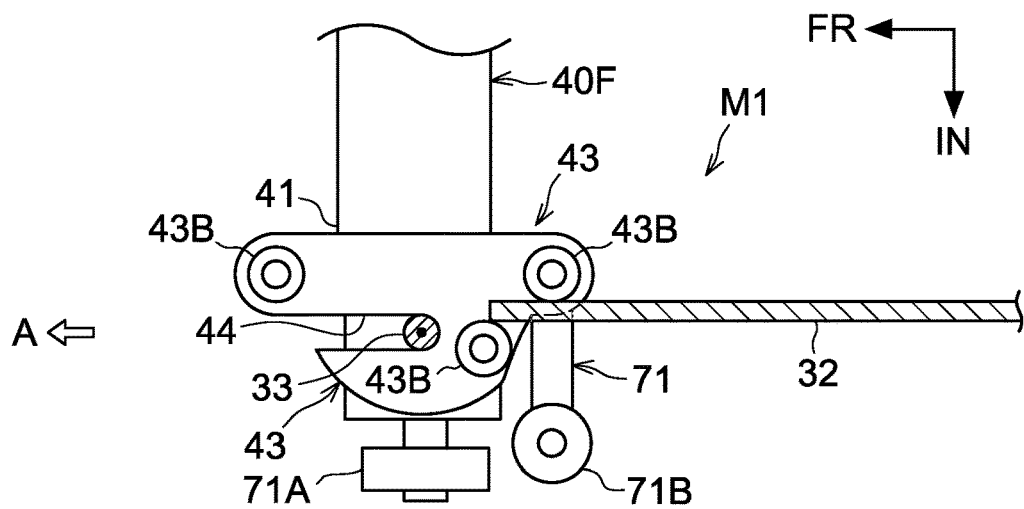
FIG. 10B is a plan view illustrating a slide restriction mechanism and a swing restriction mechanism when in a borderline state.
Figure 10C:
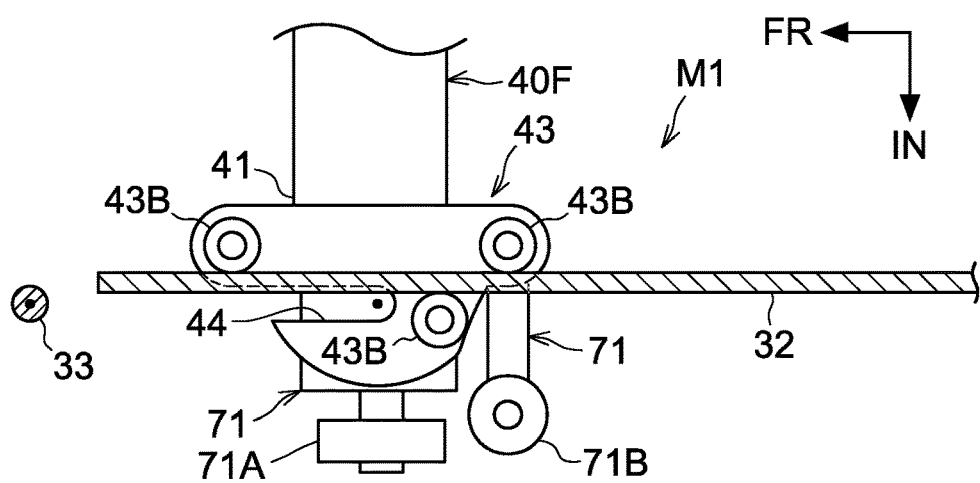
FIG. 10C is a plan view illustrating a slide restriction mechanism and a swing restriction mechanism when in a slide operation state.

Next, explanation follows regarding the slide restriction mechanism M1 and the swing restriction mechanism M2, with reference to FIG. 10A to FIG. 10C.

The slide restriction mechanism M1 is configured including the column 33 provided to the vehicle body 10 and the opening 44 provided to the add-on member 43 that is fixed to the vehicle body-side end portion 41 of the front vehicle body rail support member 40F.

The column 33 is configured in a circular column shape with an axial direction running in the vehicle vertical direction, and is provided so as to project out downward in the vehicle (see FIG. 9). The column 33 is provided at a position at the front end portion of the vehicle body rail 30, and the position of the column 33 is fixed with respect to the vehicle body 10 and the vehicle body rail 30.

The opening 44 is provided so as to open in a first direction, and the opening direction A (see arrow A in FIG. 10A, FIG. 10B) is configured as a direction perpendicular to the length direction of the front vehicle body rail support member 40F.

FIG. 10A illustrates the fully closed state. In the fully closed state, the column 33 intrudes all the way inside the opening 44 of the add-on member 43. An axial center of the column 33 and an axial center of rotation of the front vehicle body rail support member 40F with respect to the front vehicle body rail slide member 71 are thereby aligned with each other. Moreover, the opening direction A of the opening 44 faces a direction angled toward the vehicle width direction inner side with respect to the vehicle front direction.

Accordingly, in the fully closed state, the front vehicle body rail support member 40F is capable of rotating with respect to the front vehicle body rail slide member 71 with the column 33 in a state intruding all the way inside the opening 44 of the add-on member 43. Moreover, the front vehicle body rail slide member 71 is restricted from moving along the vehicle body rail 30 when in the fully closed state.

Specific explanation follows regarding this latter point.

As illustrated in FIG. 10A, in the fully closed state, if the front vehicle body rail slide member 71 attempts to move along the vehicle body rail 30 toward the vehicle rear, the add-on member 43 receives a reaction force toward the vehicle front from the column 33 intruding into the opening 44, such that the front vehicle body rail slide member 71 does not move toward the vehicle rear.

Moreover, if the front vehicle body rail slide member 71 attempts to move along the vehicle body rail 30 toward the vehicle front, similarly to as described above, the front vehicle body rail slide member 71 does not move toward the vehicle front.

As described above, in the fully closed state, movement of the front vehicle body rail slide member 71 along the vehicle body rail 30 is restricted, such that the vehicle body-side end portion 41 of the vehicle body rail support members 40 is restricted from moving along the vehicle body rail 30 as a result.

Moreover, as can be understood from the above explanation, the front vehicle body rail slide member 71 is restricted from moving along the vehicle body rail 30 not only in the fully closed state, but until the opening direction A faces toward the vehicle front.

FIG. 10B illustrates the borderline state (a state corresponding to FIG. 2).

The borderline state illustrated in FIG. 10B is reached by the front vehicle body rail support member 40F rotating with respect to the front vehicle body rail slide member 71 from the fully closed state illustrated in FIG. 10A.

In the borderline state, the opening direction A of the opening 44 faces toward the vehicle front. Accordingly, when the front vehicle body rail slide member 71 attempts to move along the vehicle body rail 30 toward the vehicle rear, the add-on member 43 does not receive a reaction force from the column 33 intruding into the opening 44. Accordingly, in the borderline state, movement of the front vehicle body rail slide member 71 along the vehicle body rail 30 toward the vehicle rear is permitted, such that movement of the vehicle body-side end portion 41 of the front vehicle body rail support member 40F toward the vehicle rear is permitted as a result.

Moreover, in the borderline state, when the front vehicle body rail slide member 71 attempts to move along the vehicle body rail 30 toward the vehicle front, the add-on member 43 receives a reaction force toward the vehicle front from the column 33 intruding into the opening 44. Accordingly, movement of the front vehicle body rail slide member 71 toward the vehicle front is restricted even in the borderline state.

Moreover, in the borderline state, out of the three vertical axis rollers 43B of the add-on member 43, the one vertical axis roller 43B positioned furthest toward the vehicle rear contacts the rotation restricting rail 32. The rotation angle range of the front vehicle body rail support member 40F is thereby restricted.

The state illustrated in FIG. 10C is achieved by the front vehicle body rail slide member 71 moving toward the vehicle rear from the borderline state illustrated in FIG. 10B. In this state, out of the three vertical axis rollers 43B configuring the rotation restricting rail contact portion, two of the vertical axis rollers 43B are positioned at the vehicle width direction outer side of the rotation restricting rail 32, and the one remaining vertical axis roller 43B is positioned at the vehicle width direction inner side of the rotation restricting rail 32. In this state, if the front vehicle body rail support member 40F attempts to rotate with respect to the front vehicle body rail slide member 71, the two vertical axis rollers 43B positioned at the vehicle width direction outer side of the rotation restricting rail 32 receive a reaction force from the rotation restricting rail 32, and the front vehicle body rail support member 40F is restricted from rotating with respect to the front vehicle body rail slide member 71. Namely, the swing restriction mechanism M2 is configured including the three vertical axis rollers 43B and the rotation restricting rail 32, and the slide operation state of the door body 20 is achieved due to the swing restriction mechanism M2.

<Tilting Suppression Mechanism>

Figure 12A:
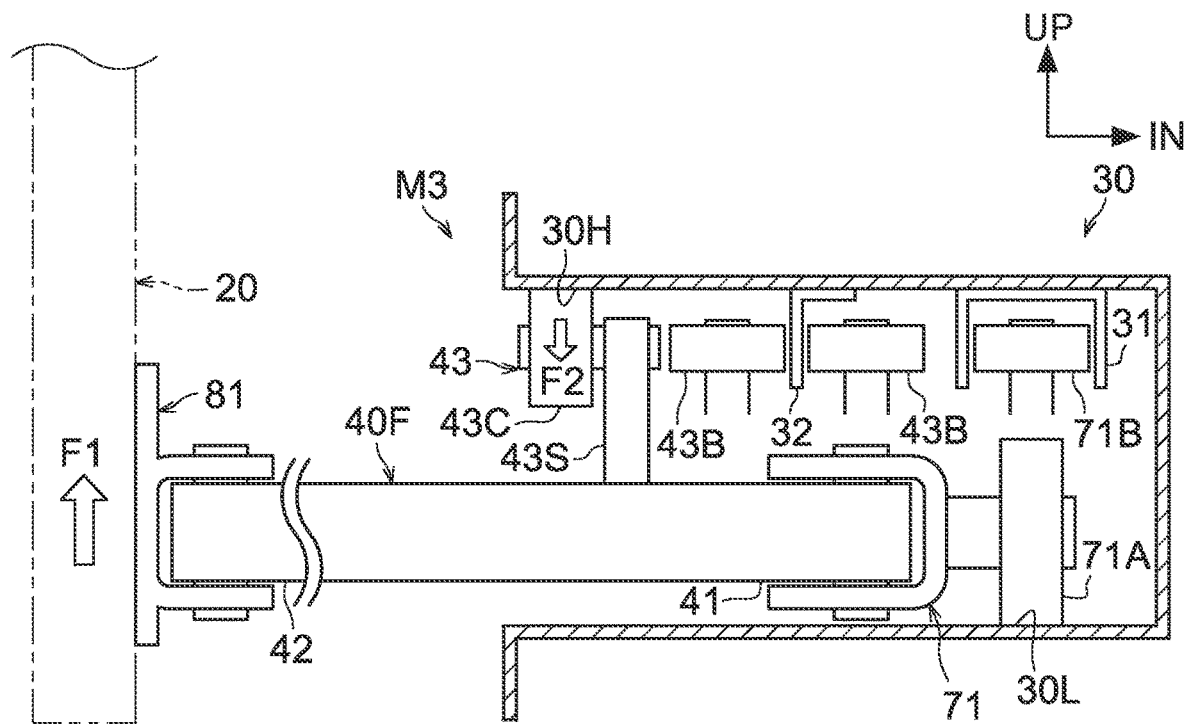
FIG. 12A is an enlarged front view illustrating the vicinity of a front vehicle body rail support member as viewed from the vehicle front.
Figure 12B:
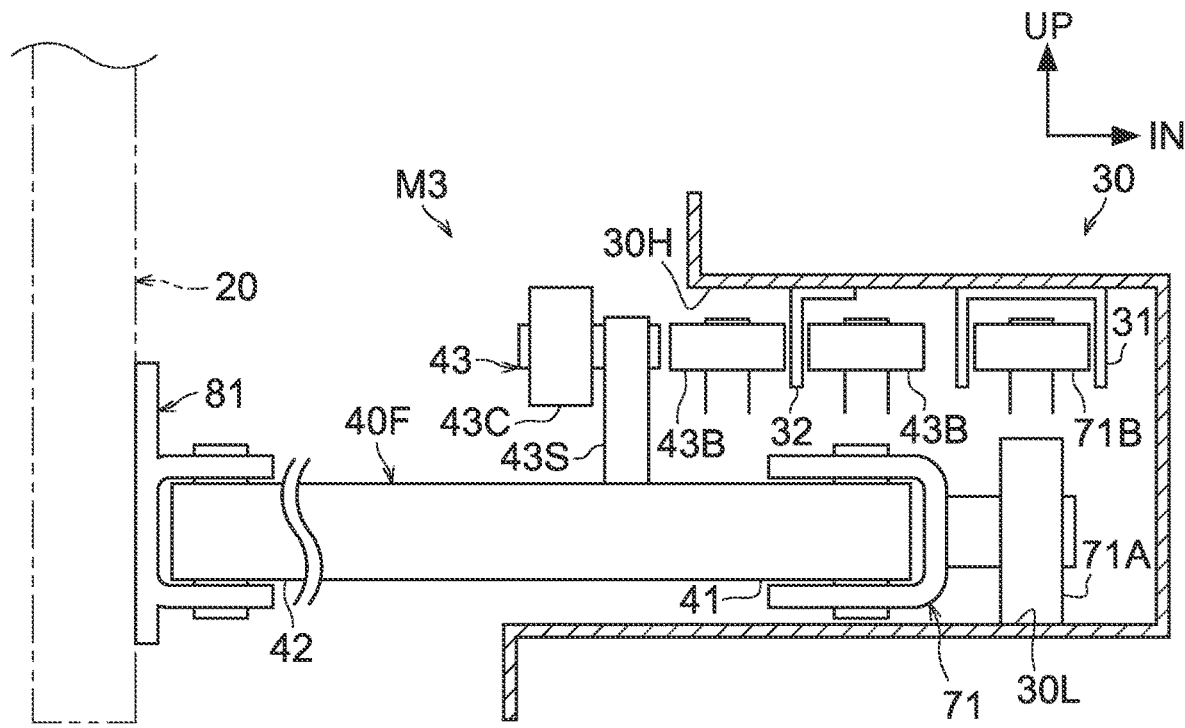
FIG. 12B is an enlarged front view illustrating the vicinity of a front vehicle body rail support member as viewed from the vehicle front.

Next, explanation follows regarding the tilting suppression mechanism M3, with reference to FIG. 12A and FIG. 12B.

FIG. 12A and FIG. 12B illustrate the vicinity of the front vehicle body rail support member 40F, as viewed from the vehicle front.

As described above, the add-on member 43 fixed to the vehicle body-side end portion 41 of the front vehicle body rail support member 40F includes the horizontal axis roller 43C, serving as a "reaction force generation portion". The horizontal axis roller 43C is attached to a support column 43S provided so as to project out upward, further toward the door body 20 side than the rotation center of the front vehicle body rail support member 40F with respect to the front vehicle body rail slide member 71.

As illustrated in FIG. 12A, the horizontal axis roller 43C contacts the upper wall 30H of the vehicle body rail 30, serving as a "tilt suppressing wall", from below in the vehicle. Due to the horizontal axis roller 43C contacting the upper wall 30H of the vehicle body rail 30 from below in the vehicle, the horizontal axis roller 43C accordingly receives a force (see the arrow F2) in a vehicle downward direction from the vehicle body rail 30. Accordingly, even if a force acts as if to move the door-side end portion 42 of the front vehicle body rail support member 40F upward (see the arrow F1), the horizontal axis roller 43C contacts the upper wall 30H of the vehicle body rail 30, enabling a reaction force (see the arrow F2) to be generated.

Moreover, the upper wall 30H of the vehicle body rail 30 is configured so as to contact the horizontal axis roller 43C in a state in which the door-side end portions 62 of the door rail support members 60H, 60L are positioned further toward the vehicle front than the position G of the center of gravity of the door, namely a state in which the front vehicle body rail slide member 71 is at a rear portion of the vehicle body rail 30. Specifically, as illustrated in FIG. 12B, the upper wall 30H of the vehicle body rail 30 is configured so as not to contact the horizontal axis roller 43C in a state in which the door-side end portions 62 of the door rail support members 60H, 60L are not positioned further toward the vehicle front than the position G of the center of gravity of the door (see FIG. 3). On the other hand, similarly to in the fully open state illustrated in FIG. 12A, the upper wall 30H of the vehicle body rail 30 is configured to contact the horizontal axis roller 43C when the door-side end portions 62 of the door rail support members 60H, 60L move from the state illustrated in FIG. 3 toward the vehicle front with respect to the door body 20 so as to move further toward the vehicle front than the position G of the center of gravity.

<Specific Configuration in the Vicinity of the Door Rail Support Members>

Figure 13:
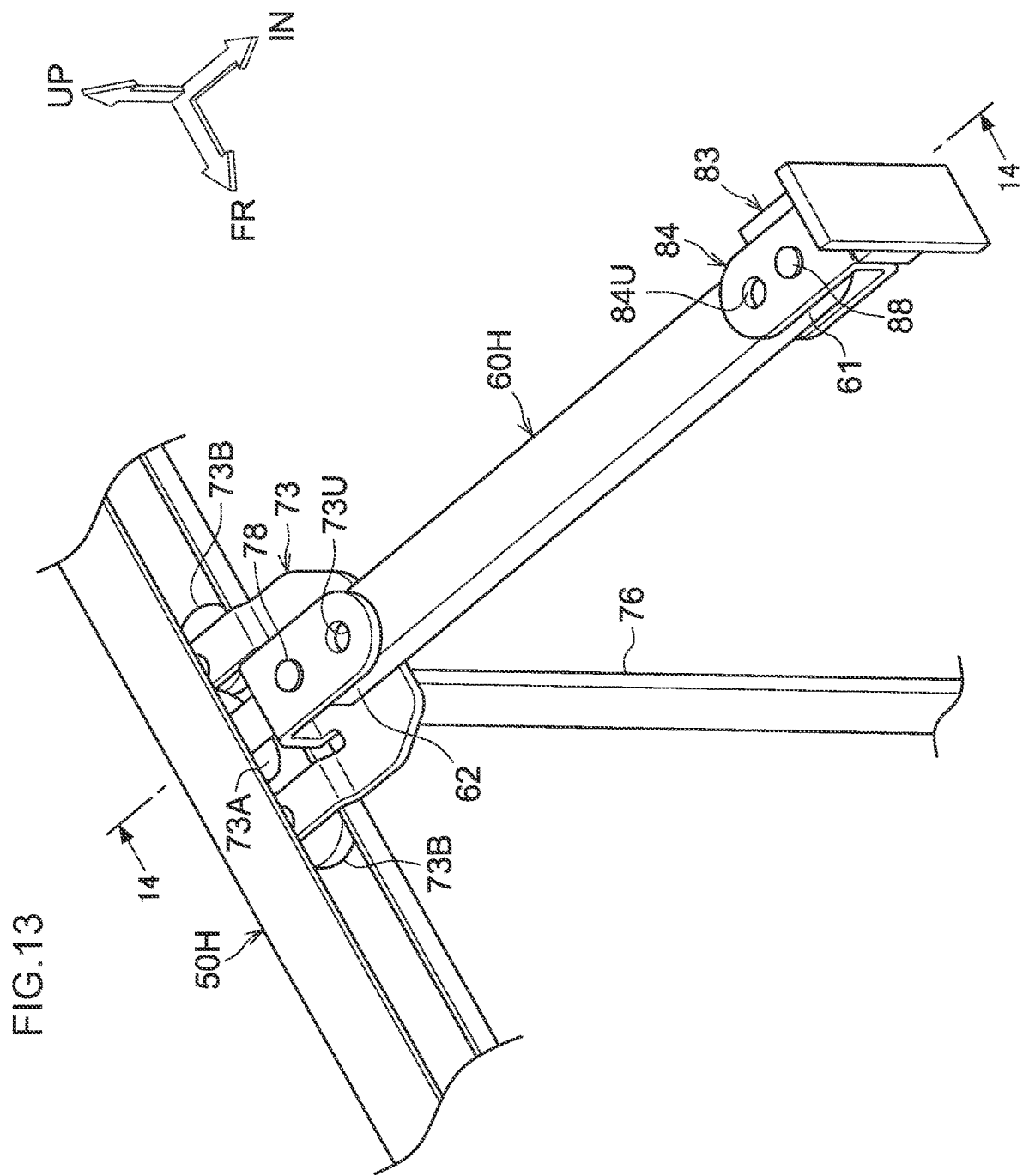
FIG. 13 is an enlarged perspective view illustrating the vicinity of an upper door rail support member.

FIG. 13 illustrates the vicinity of the upper door rail support member 60H.

A coupling member 83 is fixed to the vehicle body 10. The vehicle body-side end portion 61 of the upper door rail support member 60H is rotatably connected to the coupling member 83. The vehicle body-side end portion 61 of the upper door rail support member 60H is thereby coupled to the vehicle body 10 through the coupling member 83. The upper door rail support member 60H is capable of rotating with respect to the vehicle body 10 about a vehicle vertical direction axis centered on the vehicle body-side end portion 61.

On the other hand, an upper door rail slide member 73 is rotatably attached to the door-side end portion 62 of the upper door rail support member 60H. The upper door rail support member 60H is capable of rotating with respect to the upper door rail slide member 73 about a vehicle vertical direction axis.

The upper door rail slide member 73 includes a single horizontal axis roller 73A having an axial direction in the vehicle width direction, and two vertical axis rollers 73B having an axial direction in the vertical direction. The two vertical axis rollers 73B are provided in a row along the vehicle front-rear direction and disposed within the upper door rail 50H. Accordingly, the upper door rail slide member 73 is capable of moving along the upper door rail 50H while maintaining the same orientation.

Through the upper door rail slide member 73, the door-side end portion 62 of the upper door rail support member 60H is thus coupled to the upper door rail 50H and is also rendered capable of moving along the upper door rail 50H. The upper door rail support member 60H is also capable of rotating with respect to the door body 20 about the door-side end portion 62.

Moreover, although not illustrated in the drawings, the structure in the vicinity of the lower door rail support member 60L is a structure similar to the structure in the vicinity of the upper door rail support member 60H described above. Namely, a lower door rail slide member is rotatably attached to the door-side end portion 62 of the lower door rail support member 60L, and the lower door rail support member 60L is capable of rotating with respect to the lower door rail slide member about a vehicle vertical direction axis. The lower door rail slide member is capable of moving along the lower door rail 50L while maintaining the same orientation.

Moreover, as illustrated in FIG. 13, an upper end of a vertical coupling member 76 is connected to the upper door rail slide member 73. A lower end of the vertical coupling member 76 is connected to the lower door rail slide member, not illustrated in the drawings. Accordingly, the door-side end portion 62 of the upper door rail support member 60H and the door-side end portion 62 of the lower door rail support member 60L are coupled together along the vertical direction by the vertical coupling member 76 through the upper door rail slide member 73 and the lower door rail slide member.

<Solenoid Swing Restriction Mechanism>

Next, explanation follows regarding the solenoid swing restriction mechanism M4, with reference to FIG. 14.

FIG. 14 illustrates a cross-section taken along the length direction of the upper door rail support member 60H.

The coupling member 83 includes a rotatable support portion 84 that rotatably supports the vehicle body-side end portion 61 of the upper door rail support member 60H. The rotatable support portion 84 is configured with a rectangular groove shape (substantially U-shape) profile so as to enclose the vehicle body-side end portion 61 of the upper door rail support member 60H in the vertical direction. A shaft 88 is supported by an upper wall 84H and a lower wall 84L of the rotatable support portion 84, and the upper door rail support member 60H is rotatably connected through the shaft 88. The upper wall 84H of the rotatable support portion 84 is formed with a plunger through hole 84U at a position further toward the vehicle width direction outer side than the position of the shaft 88. A solenoid 85 is fixed to the upper wall 84H such that a plunger 85A passes through the plunger through hole 84U (note that for ease of illustration, FIG. 14 illustrates a state prior to fixing the solenoid 85).

On the other hand, an anchor hole 60U is provided to the vehicle body-side end portion 61 of the upper door rail support member 60H further toward the door-side end portion 62 side than the shaft 88. Configuration is made such that the plunger 85A enters the anchor hole 60U when the plunger 85A of the solenoid 85 projects out downward in a state in which the length direction of the upper door rail support member 60H runs along the vehicle width direction. Rotation of the upper door rail support member 60H with respect to the coupling member 83 is restricted when the plunger 85A has entered the anchor hole 60U.

Moreover, the upper door rail slide member 73 is configured with a rectangular groove shape (substantially U-shape) profile so as to enclose the door-side end portion 62 of the upper door rail support member 60H in the vertical direction. A shaft 78 is supported by an upper wall 73H and a lower wall 73L of the upper door rail slide member 73, and the upper door rail support member 60H is rotatably connected through the shaft 78. The upper wall 73H of the upper door rail slide member 73 is formed with a plunger through hole 73U at a position further toward the vehicle width direction inner side than the position of the shaft 78. A solenoid 85 is fixed to the upper wall 73H such that a plunger 85A passes through the plunger through hole 73U.

On the other hand, an anchor hole 60U is provided to the door-side end portion 62 of the upper door rail support member 60H further toward the vehicle body-side end portion 61 side than the shaft 78. Moreover, configuration is made such that the plunger 85A enters the anchor hole 60U when the plunger 85A of the solenoid 85 projects out downward in a state in which the length direction of the upper door rail support member 60H runs in the vehicle width direction, namely in a state in which the upper door rail 50H and the upper door rail support member 60H are in a perpendicular relationship to one another. Rotation of the upper door rail support member 60H with respect to the upper door rail slide member 73 is restricted when the plunger 85A has entered the anchor hole 60U.

The two solenoids 85 are controlled by a controller 86. For example, the controller 86 controls the solenoids 85 according to the position of the upper door rail slide member 73 with respect to the upper door rail 50H. Specifically, the plungers 85A of the two solenoids 85 are retracted when the upper door rail slide member 73 is positioned at a rear end of the door rail 50 (namely, in the swing operation state between the fully closed state and the borderline state). On the other hand, the plungers 85A of the two solenoids 85 are made to project out when the upper door rail slide member 73 is positioned at a position other than at the rear end of the door rail 50.

<Swing-and-Slide Drive Mechanism>

Next, explanation follows regarding a swing-and-slide drive mechanism M5 that implements the swing operation and the slide operation using electric power.

As illustrated in FIG. 15A to FIG. 15D, the swing-and-slide drive mechanism M5 includes a vehicle body-side winding roller 91, a door-side winding roller 92, a first wire 93, a second wire 94, and motors 95, serving as "drive devices", that input force to the first wire 93 and the second wire 94.

The vehicle body-side winding roller 91 is attached to the vehicle body-side end portion 61 of the upper door rail support member 60H, and the door-side winding roller 92 is attached to the door-side end portion 62 of the upper door rail support member 60H.

One end of the first wire 93 is fixed to a front end of the upper door rail 50H. An intermediate portion of the first wire 93 is entrained around the door-side winding roller 92, and the other end of the first wire 93 is connected to one motor 95 provided to the vehicle body 10. Moreover, one end of the second wire 94 is fixed to a rear end of the upper door rail 50H, an intermediate portion of the second wire 94 is entrained around the door-side winding roller 92, and the other end of the second wire 94 is connected to another motor 95. As viewed from above the vehicle, the first wire 93 and the second wire 94 are configured to cross over further toward the side of the motors 95 than the respective portions entrained around the door-side winding roller 92, after which the first wire 93 and the second wire 94 contact the vehicle body-side winding roller 91.

In the fully closed state illustrated in FIG. 15A, the respective motors 95 apply the first wire 93 with a pulling force toward the vehicle body-side, and apply the second wire 94 with a pushing force from the vehicle body-side. When this is performed, force toward the vehicle rear (see the arrow F3) is applied to the front end of the upper door rail 50H through the first wire 93, and force toward the vehicle rear (see the arrow F4) is applied to the rear end of the upper door rail 50H through the second wire 94.

In the fully closed state, since the slide operation is restricted as described above, the door body 20 swings as illustrated in FIG. 15B.

Then, on achieving the borderline state illustrated in FIG. 15C, the restriction on the slide operation of the door body 20 is released. When this occurs, the force described above acting through the first wire 93 and the second wire 94 (arrows F3, F4) acts as a force to perform the slide operation of the door body 20, and the door body 20 slides toward the vehicle rear as illustrated in FIG. 15D.

Moreover, when closing the sliding door, namely when transitioning from the fully open state to the fully closed state via the borderline state, the respective motors 95 apply the first wire 93 and the second wire 94 with force in the opposite directions to those described above such that the door body 20 performs the slide operation toward the vehicle front, followed by the swing operation, so as to achieve the fully closed state.

<Operation and Advantageous Effects>

Next, explanation follows regarding operation and advantageous effects of the sliding door structure S1 of the present exemplary embodiment.

In the sliding door structure S1 of the present exemplary embodiment, as illustrated in FIG. 1 to FIG. 4, the vehicle body 10 is provided with the vehicle body rail 30, and the vehicle body-side end portions 41 of the vehicle body rail support members 40 are coupled to the vehicle body rail 30. Moreover, the door-side end portions 42 of the vehicle body rail support members 40 are coupled to the door body 20. The door body 20 is provided with the door rail 50, and the door-side end portions 62 of the door rail support members 60 are coupled to the door rail 50. The vehicle body-side end portions 61 of the door rail support members 60 are coupled to the vehicle body 10. The door body 20 is thereby supported by the vehicle body 10.

Moreover, the vehicle body-side end portions 41 of the vehicle body rail support members 40 are capable of moving along the vehicle body rail 30, and the door-side end portions 62 of the door rail support members 60 are capable of moving along the door rail 50. Both the vehicle body rail 30 and the door rail 50 extend in a straight line shape along the vehicle front-rear direction, this being a door opening-and-closing direction. The door body 20 is thereby capable of sliding in the door opening-and-closing direction (vehicle front-rear direction) with respect to the vehicle body 10.

Moreover, the vehicle body rail support members 40 are capable of rotating with respect to the vehicle body 10 about the vehicle body-side end portions 41, and are capable of rotating with respect to the door body 20 about the door-side end portions 42. The door rail support members 60 are capable of rotating with respect to the door body 20 about the door-side end portions 62, and are capable of rotating with respect to the vehicle body 10 about the vehicle body-side end portions 61. Accordingly, the door body 20 is capable of swinging so as to move away from the vehicle body 10, and the door body 20 is also capable of swinging so as to approach the vehicle body 10.

In the sliding door structure S1 of the present exemplary embodiment, adopting the configuration described above enables an improvement in the degree of styling freedom of the vehicle body 10, while maintaining support stability of the door body 20.

Specific explanation follows regarding this point, drawing comparisons with a comparative example.

As a comparative example, a sliding door structure is envisaged in which a door body is supported through three rails provided to a vehicle body. The three rails are, for example, provided to the rocker 12, the roof-side rail 15, and the under-window portion 19 illustrated in FIG. 16. When the sliding door structure S1 of the present exemplary embodiment and the sliding door structure according to the comparative example are compared, although the point that the door body 20 is supported through three rails is the same, in the sliding door structure S1 of the present exemplary embodiment, the door body 20 is supported through the two door rails 50H, 50L provided to the door body 20, thereby enabling the number of rails provided to the vehicle body 10 to be reduced to the single vehicle body rail 30. Reducing the number of rails provided to the vehicle body 10 increases the degree of styling freedom of the vehicle body 10.

Moreover, due to making the above configuration, there is no need to provide the door rail 50 and the vehicle body rail 30 with curved sections in order to move the door body 20 away from the vehicle body 10 and toward the vehicle body 10, and both the door rails 50 and the vehicle body rail 30 extend in straight line shapes. This thereby enables an increase in the thickness of the door body 20 to be suppressed, and improves the degree of styling freedom of the portion of the vehicle body 10 (the rocker 12 in the present exemplary embodiment) where the vehicle body rail 30 is provided.

Moreover, in the sliding door structure S1 of the present exemplary embodiment, when the sliding door is opened from the fully closed state, as illustrated in FIG. 1 and FIG. 2, the vehicle body rail support members 40 rotate with respect to the vehicle body 10 about the vehicle body-side end portions 41, and the door rail support members 60 rotate with respect to the vehicle body 10 about the vehicle body-side end portions 61, while the positions of the vehicle body-side end portions 41 of the vehicle body rail support members 40 with respect to the vehicle body rail 30, and the positions of the door-side end portions 62 of the door rail support members 60 with respect to the door rail 50, remain fixed. Moreover, at the same time, the vehicle body rail support members 40 rotate with respect to the door body 20 about the door-side end portions 42, and the door rail support members 60 rotate with respect to the door body 20 about the door-side end portions 62. The door body 20 thus swings so as to move away from the vehicle body 10 toward the vehicle width direction outer side while maintaining the same orientation.

Moreover, after the door body 20 has swung and the door body 20 has moved away from the vehicle body 10 to a predetermined separation, as illustrated in FIG. 2 to FIG. 4, the vehicle body-side end portions 41 of the vehicle body rail support members 40 move along the vehicle body rail 30, and the door-side end portions 62 of the door rail support members 60 move along the door rail 50, while the angle of the vehicle body rail support members 40 with respect to the vehicle body 10 and the angle of the door rail support members 60 with respect to the vehicle body 10 remain fixed. The door body 20 thus slides toward the vehicle rear, this being the door-opening direction, with respect to the vehicle body 10 while maintaining the same orientation.

Moreover, in the sliding door structure S1 of the present exemplary embodiment, as illustrated in FIG. 2, in the borderline state where the switch between the swing operation and the slide operation takes place, the vehicle body rail support members 40 and the door rail support members 60 run in the vehicle width direction. Namely, the length direction of both the vehicle body rail support members 40 and the door rail support members 60 runs in a direction perpendicular to the door opening-and-closing direction, in a state in which the door body 20 has moved away from the vehicle body 10 by the predetermined separation. Accordingly, when the door body 20 swings from the fully closed state so as to move away from the vehicle body 10, at the moment the door body 20 reaches the predetermined separation from the vehicle body 10 (namely the moment the borderline state is reached), the movement direction of the door body 20 comes into in alignment with the vehicle rear direction, this being the door-opening direction. Accordingly, the operation of the door body 20 transitions smoothly from the swing operation to the slide operation. Moreover, when closing the sliding door, the transition from the slide operation to the swing operation is also smooth. This thereby enables smooth door opening and closing operations.

Moreover, in the sliding door structure S1 of the present exemplary embodiment, as illustrated in FIG. 9 and FIG. 10A to FIG. 10C, the column 33 is provided at the door-closing direction side (vehicle front side) end portion of the vehicle body rail 30. The opening 44 is provided to the vehicle body-side end portion 41 of the vehicle body rail support member 40.

Moreover, as illustrated in FIG. 10A, when in the fully closed state, the column 33 intrudes into the opening 44, such that the column 33 is positioned at the rotation center of the vehicle body rail support member 40 with respect to the vehicle body 10. Moreover, when in the fully closed state, the opening direction A of the opening 44 faces in a direction angled toward the vehicle inner side (vehicle width direction inner side) with respect to the door-closing direction (vehicle front direction).

When the sliding door opens from the fully closed state, the vehicle body rail support member 40 rotates about the column 33 with respect to the vehicle body 10, with the column 33 remaining in the state intruding into the opening 44. Moreover, when the sliding door opens from the fully closed state, the vehicle body-side end portion 41 of the vehicle body rail support member 40 receives a reaction force toward the door-closing direction from the column 33 intruding into the opening 44 up until the opening direction A comes into alignment with the door-closing direction (the vehicle front direction). Movement of the vehicle body-side end portions 41 of the vehicle body rail support members 40 in the door-opening direction along the vehicle body rail 30 is thereby restricted.

Accordingly, when the sliding door opens from the fully closed state, initially the operation of the door body 20 is limited to the swing operation only.

Then, when the vehicle body rail support members 40 continue to rotate with respect to the vehicle body 10, the opening direction A of the opening 44 provided to the vehicle body-side end portion 41 of the vehicle body rail support member 40 comes into alignment with the door-closing direction (vehicle front direction) (see FIG. 10B). When the opening direction A is in alignment with the door-closing direction, the vehicle body-side end portion 41 of the vehicle body rail support members 40 no longer receives a reaction force toward the door-closing direction from the column 33 intruding into the opening 44, such that the restriction of movement of the vehicle body-side end portions 41 of the vehicle body rail support members 40 along the vehicle body rail 30 in the door-opening direction is released. The slide operation of the door body 20 is thus permitted.

Moreover, in the sliding door structure S1 of the present exemplary embodiment, the rotation restricting rail 32 extending in a straight line shape along the door opening-and-closing direction (vehicle front-rear direction) is provided to the vehicle body 10, and the three vertical axis rollers 43B, serving as the "rotation restricting rail contact portion", are provided to the vehicle body-side end portion 41 of the front vehicle body rail support member 40F.

Moreover, in the slide operation state, the vertical axis roller 43B contacts the rotation restricting rail 32 at least when in a state close to the fully open state, thereby restricting the front vehicle body rail support member 40F from rotating with respect to the front vehicle body rail slide member 71, and thereby restricting rotation with respect to the vehicle body 10 as a result. Moreover, when closing the sliding door from the fully open state, the vehicle body-side end portion 41 of the vehicle body rail support members 40 moves along the vehicle body rail 30 toward the vehicle front, this being the door-closing direction, and the vertical axis rollers 43B reach the door-closing direction side (vehicle front side) end portion of the rotation restricting rail 32, thereby releasing the restriction of rotation of the vehicle body rail support members 40 with respect to the vehicle body 10.

Moreover, in the sliding door structure S1 of the present exemplary embodiment, as illustrated in FIG. 15A to FIG. 15D, the vehicle body-side winding roller 91 is attached to the vehicle body-side end portion 61 of the upper door rail support member 60H, and the door-side winding roller 92 is attached to the door-side end portion 62 of the upper door rail support member 60H. The first wire 93 is also provided, with the one end of the first wire 93 being fixed to the door-closing direction side (vehicle front side) end portion of the upper door rail 50H. The intermediate portion of the first wire 93 is entrained around the door-side winding roller 92. The second wire 94 is also provided, with the one end of the second wire 94 being fixed to the door-opening direction side (vehicle rear side) end portion of the upper door rail 50H. The intermediate portion of the second wire 94 is entrained around the door-side winding roller 92. The other end side of the first wire 93 and the other end side of the second wire 94 are connected to the respective motors 95 provided to the vehicle body 10. Due to making configuration as described above, a force to make the door body 20 perform the swing operation and a force to make the door body 20 perform the slide operation can be generated at the same time using the motors 95. This thereby enables a simple drive mechanism for the door body 20 to be achieved. Moreover, an increase in the weight of the sliding door can be suppressed by providing the motors 95 to the vehicle body 10.

Moreover, in the sliding door structure S1 of the present exemplary embodiment, the lower door rail 50L, serving as a "second door rail" extending in a straight line shape along the door opening-and-closing direction, is provided to the door body 20 at a different position to the upper door rail 50H in the vertical direction. The door-side end portion 62 of the lower door rail support member 60L, serving as a "second door rail support member", is coupled to the lower door rail 50L so as to be capable of moving along the lower door rail 50L. Moreover, the vehicle body-side end portion 61 of the lower door rail support member 60L is coupled to the vehicle body 10. The lower door rail support member 60L is capable of rotating with respect to the door body 20 about the door-side end portion 62, and is capable of rotating with respect to the vehicle body 10 about the vehicle body-side end portion 61. Accordingly, through the lower door rail 50L and the lower door rail support member 60L, the door body 20 is supported with respect to the vehicle body 10 so as to be capable of performing the swing operation and the slide operation.

Moreover, as illustrated in FIG. 13, the vertical coupling member 76 couples the door-side end portion 62 of the upper door rail support member 60H and the door-side end portion 62 of the lower door rail support member 60L together along the vertical direction. Accordingly, since the operation of the upper door rail support member 60H and the operation of the lower door rail support member 60L are coupled, even greater stability can be achieved in the operation of the door body 20.

Moreover, in the sliding door structure S1 of the present exemplary embodiment, the rear vehicle body rail support member 40R, serving as a "second vehicle body rail support member", is provided separately to the front vehicle body rail support member 40F. Similarly to the front vehicle body rail support member 40F, the rear vehicle body rail support member 40R is configured including the vehicle body-side end portion 41 coupled to the vehicle body rail 30 and capable of moving along the vehicle body rail 30, and the door-side end portion 42 coupled to the door body 20. The rear vehicle body rail support member 40R is capable of rotating with respect to the vehicle body 10 about the vehicle body-side end portion 41, and is capable of rotating with respect to the door body 20 about the door-side end portion 42. The coupling position of the door-side end portion 42 of the rear vehicle body rail support member 40R is a position further to the door-opening direction side than the position where the door-side end portion 42 of the front vehicle body rail support member 40F is coupled to the door body 20.

Moreover, as illustrated in FIG. 8, the front-rear coupling member 75 is also provided. The front-rear coupling member 75 couples the vehicle body-side end portion 41 of the front vehicle body rail support member 40F and the vehicle body-side end portion 41 of the rear vehicle body rail support member 40R together in the door opening-and-closing direction.

The operation of the front vehicle body rail support member 40F and the rear vehicle body rail support member 40R is thereby coupled, thus enabling even greater stability in the operation of the door body 20.

Moreover, in the sliding door structure S1 of the present exemplary embodiment, the position where the door-side end portion 42 of the front vehicle body rail support member 40F is coupled to the door body 20 is further toward the door-closing direction side (vehicle front side) than the position G of the center of gravity of the door. Moreover, as illustrated in FIG. 4 and FIG. 5, the positions of the door-side end portions 62 of the door rail support members 60 when in the fully open state is further toward the door-closing direction side (vehicle front side) than the position G of the center of gravity of the door. Namely, as illustrated in FIG. 4 and FIG. 5, in the fully open state, both the door-side end portions 42 of the vehicle body rail support members 40 and the door-side end portions 62 of the door rail support members 60 are positioned further toward the door-closing direction side (vehicle front side) than the position G of the center of gravity of the door. Accordingly, in the fully open state, a state exists in which the door body 20 is supported by the vehicle body rail support members 40 and the door rail support members 60 only at the door-closing direction side (vehicle front side) of the position G of the center of gravity of the door. Since the door body 20 is supported only at the door-closing direction side of the position G of the center of gravity of the door, the door body 20 has a tendency to tilt under its own weight in a manner that would cause the door-opening direction side (vehicle rear side) of the door body 20 to descend.

Moreover, as illustrated in FIG. 4, in the fully open state, the positions of the door-side end portions 62 of the door rail support members 60 are further to the door-opening direction side (vehicle rear side) than the position where the door-side end portion 42 of the front vehicle body rail support member 40F is coupled to the door body 20. Accordingly, when the door body 20 tilts in the manner described above, a vehicle upward force acts on the door-side end portion 42 of the front vehicle body rail support member 40F (see the arrow F1 in FIG. 12A).

In the sliding door structure S1 of the present exemplary embodiment, the horizontal axis roller 43C, serving as the "reaction force generation portion", is provided to the front vehicle body rail support member 40F, and the upper wall 30H of the vehicle body rail 30, serving as a "tilt suppressing wall", is provided to the vehicle body 10. Moreover, as illustrated in FIG. 12A, in the fully open state the horizontal axis roller 43C contacts the upper wall 30H of the vehicle body rail 30 from below in the vehicle, such that a vehicle downward force from the vehicle body 10 acts in the vicinity of a front end of the door body 20 through the upper wall 30H of the vehicle body rail 30, the horizontal axis roller 43C, and the front vehicle body rail support member 40F. Namely, a reaction force (arrow F2) arises against the force indicated by the arrow F1 in FIG. 12A. The door body 20 is thereby suppressed from tilting in a manner that would cause the door-opening direction side (vehicle rear side) of the door body 20 to descend.

Moreover, in the sliding door structure S1 of the present exemplary embodiment, in the fully open state, the front vehicle body rail support member 40F is positioned further toward the vehicle front than the door-side end portion 62 of the upper door rail support member 60H and the door-side end portion 62 of the lower door rail support member 60L. Accordingly, the front vehicle body rail support member 40F is also positioned further toward the vehicle front than the vertical coupling member 76 when in the fully open state.

In this manner, in the fully open state, at least one of the vehicle body rail support members 40 is positioned further toward the vehicle front than the door-side end portion 62 of at least one of the door rail support members 60 (and the vertical coupling member 76), and so the door body 20 is suppressed from rotating about an axial direction running substantially in the vehicle vertical direction, even if the door is hit by crosswind when in the fully open state.

Specific explanation follows regarding this point. First, when the door is hit by crosswind in the fully open state, the door body 20 may attempt to rotate about an axial direction running substantially in the vehicle vertical direction in a direction that would displace a rear section of the door body 20 toward the vehicle width direction inner side. However, a force that suppresses the above rotation (a force pulling a front section of the door body 20 toward the vehicle width direction inner side) can be generated by the vehicle body rail support members 40 positioned further toward the vehicle front than the door-side end portions 62 of the door rail support members 60 (and the vertical coupling member 76). The door body 20 can thus be suppressed from rotating about an axial direction running substantially in the vehicle vertical direction.

Supplementary Explanation of the Above Exemplary Embodiment

Note that in the exemplary embodiment described above, explanation has been given regarding the sliding door structure S1 in which the door body 20 opens by moving toward the vehicle rear, and the door body 20 closes by moving toward the vehicle front. However, the present invention is not limited thereto. For example, a sliding door structure may be configured in which a door body opens by moving toward a vehicle front, and the door body closes by moving toward the vehicle rear (in such cases, the vehicle front corresponds to the "door-opening direction", and the vehicle rear corresponds to the "door-closing direction"). Moreover, a sliding door structure may be configured in which a door body opens by moving toward the right of a vehicle at a rear end portion, and the door body closes by moving toward the left of the vehicle (in such cases, the vehicle right direction corresponds to the "door-opening direction", and the vehicle left direction corresponds to the "door-closing direction").

Moreover, in the exemplary embodiment described above, explanation has been given regarding an example in which the slide restriction mechanism M1 is configured so as to restrict movement of the front vehicle body rail support member 40F along the vehicle body rail 30, namely an example in which the slide restriction mechanism is configured including the column 33 provided at the door-closing direction side (vehicle front side) end portion of the vehicle body rail 30, and the opening 44 provided to the vehicle body-side end portion 41 of the front vehicle body rail support member 40F. However, the slide restriction mechanism is not limited thereto, and, for example, a slide restriction mechanism may be configured to restrict movement of a door rail support member along a door rail. In such cases, the slide restriction mechanism is configured including a column provided at a door-opening direction side (vehicle rear side) end portion of the door rail, and an opening provided on a door-side end portion of the door rail support member.

Moreover, in the exemplary embodiment described above, explanation has been given regarding an example in which the solenoid swing restriction mechanism M4 is applied to the upper door rail support member 60H, and is configured so as to restrict rotation of the upper door rail support member 60H with respect to the vehicle body 10 and the door body 20. However, the present invention is not limited thereto. For example, a solenoid swing restriction mechanism may be applied to the lower door rail support member 60L, or may be applied to the vehicle body rail support members 40.

Moreover, in the exemplary embodiment described above, explanation has been given regarding an example in which the slide restriction mechanism M1, the swing restriction mechanism M2, and the solenoid swing restriction mechanism M4 are provided in order to split the operation of the door body 20 into the swing operation and the slide operation. However, the present invention is not limited thereto. The operation of the door body 20 may be split into the swing operation and the slide operation using a mechanism other than the mechanism explained in the exemplary embodiment described above.

Moreover, in the exemplary embodiment described above, explanation has been given regarding an example (see FIG. 12B) in which the upper wall 30H of the vehicle body rail 30 is configured so as not to contact the horizontal axis roller 43C when in a state (see FIG. 3) in which the door-side end portions 62 of the door rail support members 60H, 60L are not positioned further toward the vehicle front than the position G of the center of gravity of the door. However, the present invention is not limited thereto. For example, configuration may be made in which the upper wall 30H of the vehicle body rail 30 is always in contact with the horizontal axis roller 43C when in the slide operation state.

What is claimed is:

1. A sliding door structure comprising:
   a door body;
   a vehicle body rail that is provided to a vehicle body so as to extend along a door opening-and-closing direction in a straight line shape;
   a vehicle body rail support member that is configured to include a vehicle body-side end portion coupled to the vehicle body rail and capable of moving along the vehicle body rail, and a door-side end portion coupled to the door body, the vehicle body rail support member being capable of rotating with respect to the vehicle body about the vehicle body-side end portion, and the vehicle body rail support member being capable of rotating with respect to the door body about the door-side end portion;

a door rail that is provided to the door body so as to extend along the door opening-and-closing direction in a straight line shape; and a door rail support member that is configured to include a door-side end portion coupled to the door rail and capable of moving along the door rail, and a vehicle body-side end portion coupled to the vehicle body, the door rail support member being capable of rotating with respect to the door body about the door-side end portion, and the door rail support member being capable of rotating with respect to the vehicle body about the vehicle body-side end portion, wherein the sliding door structure further comprises a column that is provided to a door-closing direction side end portion of the vehicle body rail, and an opening that is provided to the vehicle body-side end portion of the vehicle body rail support member, in a fully closed state, the column intrudes into the opening such that the column is positioned at a rotation center of the vehicle body rail support member with respect to the vehicle body, and an opening direction of the opening faces in a direction angled toward a vehicle inner side with respect to a door-closing direction, when a sliding door comprising the door body opens from the fully closed state, the vehicle body rail support member rotates about the column with respect to the vehicle body while the column remains in a state intruding into the opening, when the sliding door opens from the fully closed state, until the opening direction comes into alignment with the door-closing direction, movement of the vehicle body-side end portion of the vehicle body rail support member along the vehicle body rail in a door-opening direction is restricted due to receiving a reaction force toward the door-closing direction from the column intruding into the opening, and when the opening direction aligns with the door-closing direction, the restriction of movement of the vehicle body-side end portion of the vehicle body rail support member along the vehicle body rail in the door-opening direction is released due to no longer receiving the reaction force toward the door-closing direction from the column intruding into the opening.

2. The sliding door structure of claim 1, wherein, when a sliding door comprising the door body opens from a fully closed state:

the door body swings so as to move away from the vehicle body by the vehicle body rail support member rotating with respect to the vehicle body about the vehicle body-side end portion of the vehicle body rail support member and the door rail support member rotating with respect to the vehicle body about the vehicle body-side end portion of the door rail support member while a position of the vehicle body-side end portion of the vehicle body rail support member with respect to the vehicle body rail and a position of the door-side end portion of the door rail support member with respect to the door rail remain fixed; and after the door body has swung and the door body has moved away from the vehicle body by a predetermined separation, the door body slides in the door-opening direction with respect to the vehicle body by the vehicle body-side end portion of the vehicle body rail support member moving along the vehicle body rail, and the door-side end portion of the door rail support member moving along the door rail while an angle of the vehicle body rail support member with respect to the vehicle body and an angle of the door rail support member with respect to the vehicle body remain fixed.

3. The sliding door structure of claim 2, wherein a length direction of the vehicle body rail support member and of the door rail support member runs in a direction perpendicular to the door opening-and-closing direction in a state in which the door body has moved away from the vehicle body by the predetermined separation.

4. The sliding door structure of claim 1, wherein:

the sliding door structure further comprises a rotation restricting rail that is provided to the vehicle body so as to extend along the door opening-and-closing direction in a straight line shape, and a rotation restricting rail contact portion that is provided to the vehicle body-side end portion of the vehicle body rail support member;

in a state close to a fully open state, the vehicle body rail support member is restricted from rotating with respect to the vehicle body by the rotation restricting rail contact portion contacting the rotation restricting rail; and when closing a sliding door comprising the door body, the restriction of the rotation of the vehicle body rail support member with respect to the vehicle body is released by the vehicle body-side end portion of the vehicle body rail support member moving along the vehicle body rail in a door-closing direction, and the rotation restricting rail contact portion reaching a door-closing direction side end portion of the rotation restricting rail.

5. The sliding door structure of claim 1, further comprising:

a vehicle body-side winding roller that is attached to the vehicle body-side end portion of the door rail support member;

a door-side winding roller that is attached to the door-side end portion of the door rail support member;

a first wire having one end fixed to a door-closing direction side end portion of the door rail, and having an intermediate portion entrained around the door-side winding roller;

a second wire having one end fixed to a door-opening direction side end portion of the door rail, and having an intermediate portion entrained around the door-side winding roller; and a drive device that is provided to the vehicle body, that is connected to another end side of the first wire and to another end side of the second wire, and that generates a force to cause the door body to perform a swing operation and a force to cause the door body to perform a slide operation at the same time.

6. The sliding door structure of claim 1, further comprising:

a second door rail that is provided to the door body at a different vertical direction position to the door rail, and that extends along the door opening-and-closing direction in a straight line shape;

a second door rail support member that is configured to include a door-side end portion coupled to the second door rail and capable of moving along the second door rail, and a vehicle body-side end portion coupled to the vehicle body, the second door rail support member being capable of rotating with respect to the door body about the door-side end portion of the second door rail support member, and the second door rail support member being capable of rotating with respect to the vehicle body about the vehicle body-side end portion of the second door rail support member; and a vertical coupling member that couples the door-side end portion of the door rail support member and the door-side end portion of the second door rail support member together in a vertical direction.

7. The sliding door structure of claim 1, further comprising:

a second vehicle body rail support member that is configured to include a vehicle body-side end portion coupled to the vehicle body rail and capable of moving along the vehicle body rail, and a door-side end portion coupled to the door body at a position further toward a door-opening direction side than a position where the door-side end portion of the vehicle body rail support member is coupled to the door body, the second vehicle body rail support member being capable of rotating with respect to the vehicle body about the vehicle body-side end portion of the second vehicle body rail support member, and the second vehicle body rail support member being capable of rotating with respect to the door body about the door-side end portion of the second vehicle body rail support member; and a front-rear coupling member that couples the vehicle body-side end portion of the vehicle body rail support member and the vehicle body-side end portion of the second vehicle body rail support member together in the door opening-and-closing direction.

8. The sliding door structure of claim 1, wherein:

a position where the door-side end portion of the vehicle body rail support member is coupled to the door body is further toward a door-closing direction side than a position of the center of gravity of a door;

a position of the door-side end portion of the door rail support member when in a fully open state is further toward the door-closing direction side than the position of the center of gravity of the door, and further toward a door-opening direction side than a position where the door-side end portion of the vehicle body rail support member is coupled to the door body; and the sliding door structure further comprises:

a reaction force generation portion that is provided to the vehicle body rail support member; and a tilt suppressing wall that is provided to the vehicle body, and that is configured such that the reaction force generation portion contacts the tilt suppressing wall from below in the vehicle body at least when in the fully open state.

* * * * *